United States Patent
Milton et al.

(10) Patent No.: US 10,336,379 B2
(45) Date of Patent: Jul. 2, 2019

(54) VEHICLE REAR SUSPENSION SYSTEM

(71) Applicants: NIKOLA MOTOR COMPANY LLC, Salt Lake City, UT (US); ARVINMERITOR TECHNOLOGY, LLC, Troy, MI (US)

(72) Inventors: Trevor R. Milton, Salt Lake City, UT (US); Kevin M. Lynk, Salt Lake City, UT (US); Adam Sadlik, Troy, MI (US); Edwin Lorenz, Troy, MI (US); Michael Schlundt, Troy, MI (US); Paul Barr, Troy, MI (US)

(73) Assignees: NIKOLA MOTOR COMPANY LLC, Salt Lake City, UT (US); ARVINMERITOR TECHNOLOGY, LLC, Troy, MI (US)

( * ) Notice: Subject to any disclaimer, the term of this patent is extended or adjusted under 35 U.S.C. 154(b) by 0 days.

(21) Appl. No.: 15/366,472

(22) Filed: Dec. 1, 2016

(65) Prior Publication Data
US 2017/0320367 A1 Nov. 9, 2017

Related U.S. Application Data

(62) Division of application No. 15/357,350, filed on Nov. 21, 2016, now Pat. No. 10,207,751.
(Continued)

(51) Int. Cl.
*B62D 35/00* (2006.01)
*B60G 3/06* (2006.01)
(Continued)

(52) U.S. Cl.
CPC ............ *B62D 35/001* (2013.01); *B60G 3/06* (2013.01); *B60G 3/20* (2013.01); *B60G 7/001* (2013.01);
(Continued)

(58) Field of Classification Search
CPC ....... B60G 7/001; B60G 11/27; B60K 17/043
(Continued)

(56) References Cited

U.S. PATENT DOCUMENTS 2,866,651 A 12/1958 Powell
2,971,772 A * 2/1961 Tantlinger .............. B60G 5/047
267/66

(Continued)

FOREIGN PATENT DOCUMENTS

CN 204399316 U 6/2015
DE 31 36 305 A1 3/1983
(Continued)

OTHER PUBLICATIONS

PCT International Search Report dated Jul. 17, 2017, Application No. PCT/US2017/031653, Applicant BLUEGENTECH, LLC, 2 Pages.
(Continued)

*Primary Examiner* — Jacob D Knutson
(74) *Attorney, Agent, or Firm* — Brooks Kushman P.C.

(57) ABSTRACT

A rear suspension for a vehicle includes a knuckle for supporting a rear wheel of the vehicle, and the knuckle defines an opening. The rear suspension system further includes two suspension devices configured to be connected to the vehicle and an upper portion of the knuckle, such that each suspension device is oriented along an upright axis when the rear suspension system is mounted on the vehicle. In addition, the rear suspension system includes a control arm having a first portion configured to be connected to the vehicle and a second portion configured to extend between the axes of the suspension devices and into the opening of the knuckle when the rear suspension system is mounted on the vehicle.

24 Claims, 13 Drawing Sheets

Related U.S. Application Data

(60) Provisional application No. 62/391,745, filed on May 9, 2016.

(51) Int. Cl.

| | | |
|---|---|---|
| *B60K 1/02* | (2006.01) | |
| *B60K 17/04* | (2006.01) | |
| *F16H 3/08* | (2006.01) | |
| *F16H 57/025* | (2012.01) | |
| *F16H 57/04* | (2010.01) | |
| *B60G 7/00* | (2006.01) | |
| *B60G 13/10* | (2006.01) | |
| *B60G 11/27* | (2006.01) | |
| *B60J 1/00* | (2006.01) | |
| *B60J 1/02* | (2006.01) | |
| *B60K 1/00* | (2006.01) | |
| *B60K 7/00* | (2006.01) | |
| *B60G 3/20* | (2006.01) | |
| *B60K 17/08* | (2006.01) | |
| *B60K 17/14* | (2006.01) | |
| *F16H 57/02* | (2012.01) | |

(52) U.S. Cl.
CPC .............. *B60G 11/27* (2013.01); *B60G 13/10* (2013.01); *B60J 1/008* (2013.01); *B60J 1/02* (2013.01); *B60K 1/00* (2013.01); *B60K 1/02* (2013.01); *B60K 7/0007* (2013.01); *B60K 17/043* (2013.01); *B60K 17/08* (2013.01); *B60K 17/145* (2013.01); *F16H 3/08* (2013.01); *F16H 57/025* (2013.01); *F16H 57/0424* (2013.01); *F16H 57/0476* (2013.01); *B60G 2200/14* (2013.01); *B60G 2200/144* (2013.01); *B60G 2202/1524* (2013.01); *B60G 2204/4191* (2013.01); *B60G 2206/011* (2013.01); *B60G 2206/0114* (2013.01); *B60G 2300/02* (2013.01); *B60G 2300/50* (2013.01); *B60K 2001/001* (2013.01); *B60K 2007/0038* (2013.01); *B60K 2007/0046* (2013.01); *B60K 2007/0061* (2013.01); *B60Y 2200/14* (2013.01); *B60Y 2400/3032* (2013.01); *F16H 2057/02034* (2013.01)

(58) Field of Classification Search
USPC ......................................................... 180/255
See application file for complete search history.

(56) References Cited

U.S. PATENT DOCUMENTS

| | | | |
|---|---|---|---|
| 2,998,264 A | 8/1961 | Stump | |
| 3,007,716 A | 11/1961 | Maharick | |
| 3,477,738 A | 11/1969 | Manning | |
| 4,174,855 A | 11/1979 | Vandenberg | |
| 4,274,338 A | 6/1981 | Uozumi | |
| 4,313,619 A | 2/1982 | Hailer | |
| 4,813,704 A * | 3/1989 | Smith | B60G 3/265 |
| | | | 280/124.109 |
| 4,974,872 A * | 12/1990 | Riese | B60G 3/00 |
| | | | 280/124.145 |
| 5,396,968 A | 3/1995 | Hasebe et al. | |
| 5,413,462 A | 5/1995 | Alberni | |
| 5,879,265 A | 3/1999 | Bek | |
| 5,927,417 A | 7/1999 | Brunner et al. | |
| 6,290,244 B1 * | 9/2001 | Hosoya | B60G 11/28 |
| | | | 280/124.157 |
| 6,349,782 B1 | 2/2002 | Sekiya et al. | |
| 6,357,769 B1 | 3/2002 | Omundson et al. | |
| 6,428,027 B1 | 8/2002 | Stuart | |
| 6,840,525 B1 | 1/2005 | Griffiths | |
| 6,866,295 B2 | 3/2005 | Ziech et al. | |
| 6,886,647 B1 | 5/2005 | Gotta | |
| 7,464,779 B2 | 12/2008 | Grabmaier et al. | |
| 7,819,411 B2 * | 10/2010 | Eshelman | B60G 3/20 |
| | | | 280/124.135 |
| 7,971,890 B2 * | 7/2011 | Richardson | B60G 3/18 |
| | | | 280/124.135 |
| 8,402,878 B2 | 3/2013 | Schreiner et al. | |
| 8,579,308 B2 | 11/2013 | Weeks et al. | |
| 8,640,801 B2 | 2/2014 | Hennings et al. | |
| 8,678,118 B2 | 3/2014 | Takenaka et al. | |
| 8,960,341 B2 | 2/2015 | Weber | |
| 9,221,496 B2 | 12/2015 | Barr et al. | |
| 9,266,423 B2 | 2/2016 | Hoshinoya et al. | |
| 9,533,711 B2 | 1/2017 | Hirsch et al. | |
| 2002/0163174 A1 | 11/2002 | Bell et al. | |
| 2003/0064846 A1 | 4/2003 | Klemen et al. | |
| 2003/0098564 A1 * | 5/2003 | VanDenberg | B60G 9/02 |
| | | | 280/124.157 |
| 2003/0122340 A1 * | 7/2003 | Varela | B60G 3/20 |
| | | | 280/124.135 |
| 2004/0150142 A1 | 8/2004 | Warinner et al. | |
| 2004/0183271 A1 | 9/2004 | Galazin et al. | |
| 2006/0192361 A1 | 8/2006 | Anderson et al. | |
| 2006/0208447 A1 | 9/2006 | Eshelman et al. | |
| 2007/0259747 A1 | 11/2007 | Thomas et al. | |
| 2008/0179116 A1 | 7/2008 | Ikenoya et al. | |
| 2008/0315546 A1 | 12/2008 | Kucinski et al. | |
| 2009/0014223 A1 | 1/2009 | Jones et al. | |
| 2009/0057050 A1 * | 3/2009 | Shiino | B60G 7/006 |
| | | | 180/412 |
| 2010/0025131 A1 | 2/2010 | Gloceri et al. | |
| 2010/0038877 A1 | 2/2010 | Cortez et al. | |
| 2010/0117318 A1 | 5/2010 | Grozev et al. | |
| 2010/0276901 A1 | 11/2010 | Richardson et al. | |
| 2011/0214947 A1 | 9/2011 | Tuomas | |
| 2013/0175779 A1 | 7/2013 | Kvien et al. | |
| 2014/0182954 A1 * | 7/2014 | Weber | H02K 7/116 |
| | | | 180/65.7 |
| 2014/0327720 A1 | 11/2014 | Holt et al. | |
| 2015/0266373 A1 | 9/2015 | Wang | |
| 2016/0076610 A1 | 3/2016 | White et al. | |
| 2017/0320365 A1 | 11/2017 | Lorenz et al. | |
| 2017/0320366 A1 | 11/2017 | Milton et al. | |
| 2017/0320382 A1 | 11/2017 | Milton et al. | |
| 2017/0320522 A1 | 11/2017 | Lorenz et al. | |
| 2018/0237070 A1 | 8/2018 | Lorenz et al. | |

FOREIGN PATENT DOCUMENTS

| | | |
|---|---|---|
| DE | 198 60 230 A1 | 2/2000 |
| DE | 102011084858 A1 | 4/2013 |
| DE | 21 2013 000 235 U1 | 7/2015 |
| EP | 0 931 684 A1 | 7/1999 |
| EP | 0 742 113 B1 | 10/2001 |
| EP | 1 724 130 A1 | 11/2006 |
| EP | 1 900 554 B1 | 11/2011 |
| EP | 1900554 B1 | 11/2011 |
| EP | 1628854 B1 | 11/2012 |
| JP | 6-64419 A | 8/1994 |
| JP | H0664419 A * | 8/1998 |
| PL | 04050142 A | 6/2006 |
| WO | 01/23245 A1 | 4/2001 |
| WO | 01/51300 A1 | 7/2001 |
| WO | 2015/110965 A2 | 7/2015 |
| WO | 2017/196633 A1 | 11/2017 |
| WO | 2017/196776 A1 | 11/2017 |
| WO | 2017/196778 A1 | 11/2017 |

OTHER PUBLICATIONS

PCT Written Opinion of the International Search Authority dated Jul. 17, 2017, Application No. PCT/US2017/031653, Applicant BLUEGENTECH, LLC, 6 Pages.

PCT International Search Report dated Jul. 20, 2017, Application No. PCT/US2017/031651, Applicant BLUEGENTECH, LLC, 2 Pages.

(56) References Cited

OTHER PUBLICATIONS

PCT Written Opinion of the International Search Authority dated Jul. 20, 2017, Application No. PCT/US2017/031651, Applicant BLUEGENTECH, LLC, 7 Pages.
PCT International Search Report dated Sep. 6, 2017, Application No. PCT/US17/31056, Applicant BLUEGENTECH, LLC, 4 Pages.
PCT Written Opinion of the International Search Authority dated Sep. 6, 2017, Application No. PCT/US17/31056, Applicant BLUEGENTECH, LLC, 5 Pages.
U.S. Office Action dated Oct. 6, 2017, U.S. Appl. No. 15/357,350, 14 Pages.
U.S. Amendment Under 37 C.F.R. 1.111 dated Feb. 5, 2018, U.S. Appl. No. 15/357,350, 10 Pages.
U.S. Amendment Under 37 C.F.R. 1.116 dated Jul. 17, 2018, U.S. Appl. No. 15/357,350, 8 Pages.
U.S. Notice of Allowance dated Jul. 27, 2018, U.S. Appl. No. 15/357,350, 13 Pages.
U.S. Final Office Action dated Apr. 17, 2018, U.S. Appl. No. 15/357,350, 22 Pages.
U.S. Non-Final Office Action dated Apr. 2, 2018, U.S. Appl. No. 15/366,452, 31 Pages.
U.S. Notice of Allowance dated Jun. 26, 2018, U.S. Appl. No. 15/498,557, 16 Pages.
Extended European Search Report dated Aug. 25, 2017, Application No. 17169629.7-1755, Applicant ArvinMeritor Technology, LLC, 11 Pages.
Extended European Search Report dated Sep. 7, 2017, Application No. 17169640.4-1755, Applicant ArvinMeritor Technology, LLC, 14 Pages.
U.S. Amendment Under 37 CFR 1.111 filed Oct. 1, 2018, U.S. Appl. No. 14/366,452 9 Pages.
U.S. Non-Final Office Action dated Oct. 18, 2018, U.S. Appl. No. 15/498,550.
U.S. Notice of Allowance dated Dec. 5, 2018, U.S. Appl. No. 15/498,557, 17 Pages.
U.S. Non-Final Office Action dated Dec. 14, 2018, U.S. Appl. No. 15/366,452, 29 Pages.

\* cited by examiner

VEHICLE REAR SUSPENSION SYSTEM

CROSS-REFERENCE TO RELATED APPLICATIONS

This application is a division of U.S. application Ser. No. 15/357,350, filed Nov. 21, 2016, which claims the benefit of U.S. provisional application Ser. No. 62/391,745 filed May 9, 2016, the disclosures of which are hereby incorporated in their entirety by reference herein.

TECHNICAL FIELD

The disclosure relates to a rear suspension system for use with a vehicle.

BACKGROUND

Prior vehicle suspension systems are disclosed in U.S. Pat. No. 6,357,769 and U.S. Patent Application Publication No. 2003/0098564.

SUMMARY

According to one aspect of the disclosure, a rear suspension system is provided for a vehicle. The rear suspension system includes a knuckle for supporting a rear wheel of the vehicle, and the knuckle defines an opening. The rear suspension system further includes two suspension devices configured to be connected to the vehicle and an upper portion of the knuckle, such that each suspension device is oriented along an upright axis when the rear suspension system is mounted on the vehicle. In addition, the rear suspension system includes a control arm having a first portion configured to be connected to the vehicle and a second portion configured to extend between the axes of the suspension devices and into the opening of the knuckle when the rear suspension system is mounted on the vehicle.

A vehicle according to the disclosure includes a vehicle support structure, first and second rear wheels that are each rotatable with respect to the vehicle support structure, and first and second independent rear suspension systems associated with the first and second rear wheels, respectively. Each rear suspension system includes a knuckle that supports one of the rear wheels, and the knuckle defines an opening. Each rear suspension system further includes two suspension devices connected to the vehicle support structure and an upper portion of the knuckle, such that each suspension device is oriented along an axis, and a control arm having a first portion supported by the vehicle support structure and a second portion that extends between the axes and into the opening of the knuckle.

According to yet another aspect of the disclosure, a rear suspension system for a vehicle having a rear wheel and tire is provided. The rear suspension system includes a knuckle for supporting the rear wheel, wherein an upper portion of the knuckle defines an opening. The rear suspension system further includes an upper control arm and a lower control arm. The upper control arm has a first portion configured to be connected to the vehicle and a second portion configured to extend into the opening of the knuckle and be connected to the upper portion of the knuckle at a first connection location. The lower control arm has a first portion configured to be connected to the vehicle and a second portion configured to be connected to a lower portion of the knuckle at a second connection location such that the first and second connection locations are generally vertically aligned with each other, when viewed in a longitudinal direction of the vehicle, and positioned proximate the tire of the vehicle when the rear suspension system is mounted on the vehicle.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
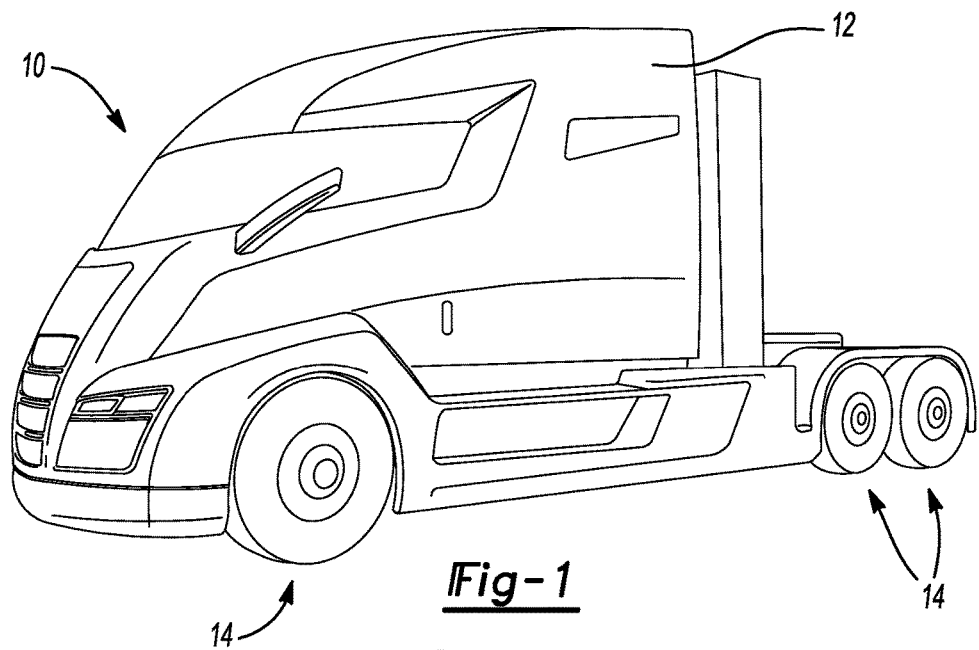
FIG. 1 is a perspective view of a vehicle according to the present disclosure.

A vehicle according to the present disclosure may be any suitable vehicle, such as a passenger car, truck, etc. FIG. 1 shows an exemplary vehicle, which is an electric driven class 8 semi-truck 10 called the NIKOLA ONE™. In one embodiment, the truck 10 may be configured to pull a total gross weight of 80,000 lbs. approximately 1,200 miles between stops, or even more than 1,200 miles between stops. The truck 10 shown in FIG. 1 has an aerodynamic cab 12, six rotatable wheels 14, and an electric motor and associated gear train (e.g., gear train with dual gear reduction) at every wheel (6×6), which motors and gear trains may be grouped in pairs to form a motor gearbox assembly as described below in further detail. In the embodiment shown in FIG. 1, the four rear wheels 14 each include a dual wheel pair (two wheels that rotate together). In the embodiment shown in FIGS. 2 and 3, the rear wheels 14 each include a relatively larger wheel and associated tire (e.g., super single wheel and tire). While each electric motor may be configured to produce any suitable horsepower (HP), such as 100 to 400 HP, in one embodiment each motor may be sized to produce 335 HP such that the truck 10, with six motors combined, may output about 2,000 HP and over 3,700 ft. lbs. of torque before gear reduction, and nearly 86,000 ft. lbs. of instant torque after gear reduction. The truck's six electric motors may produce superior horsepower, torque, acceleration, pulling and stopping power over other class 8 trucks currently on the road. The truck 10 may further include an independent suspension system, such as a short/long arm (SLA) suspension system, for each of the six wheels 14 as described below in further detail.

Figure 2:
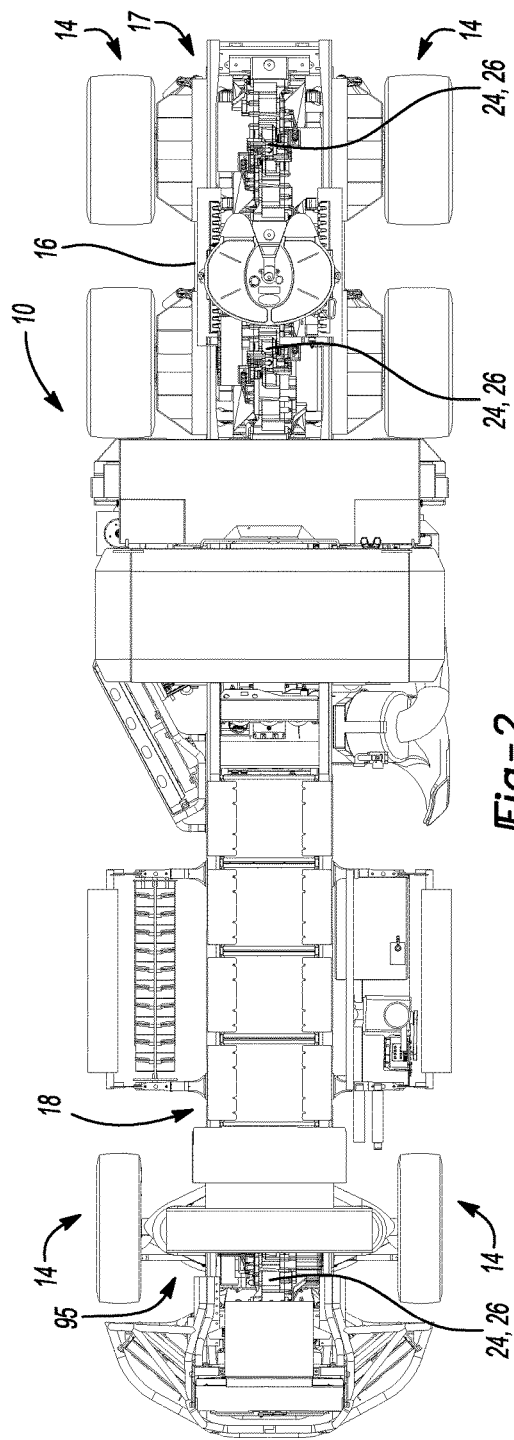
FIG. 2 is a top view of a chassis assembly of the vehicle, which includes three axle pairs connected to six wheels and three dual motor gearbox assemblies according to the disclosure for driving the wheels, wherein each wheel may be a single wheel, such as at a front of the vehicle, or a double wheel pair, such as at a rear of the vehicle.
Figure 3:
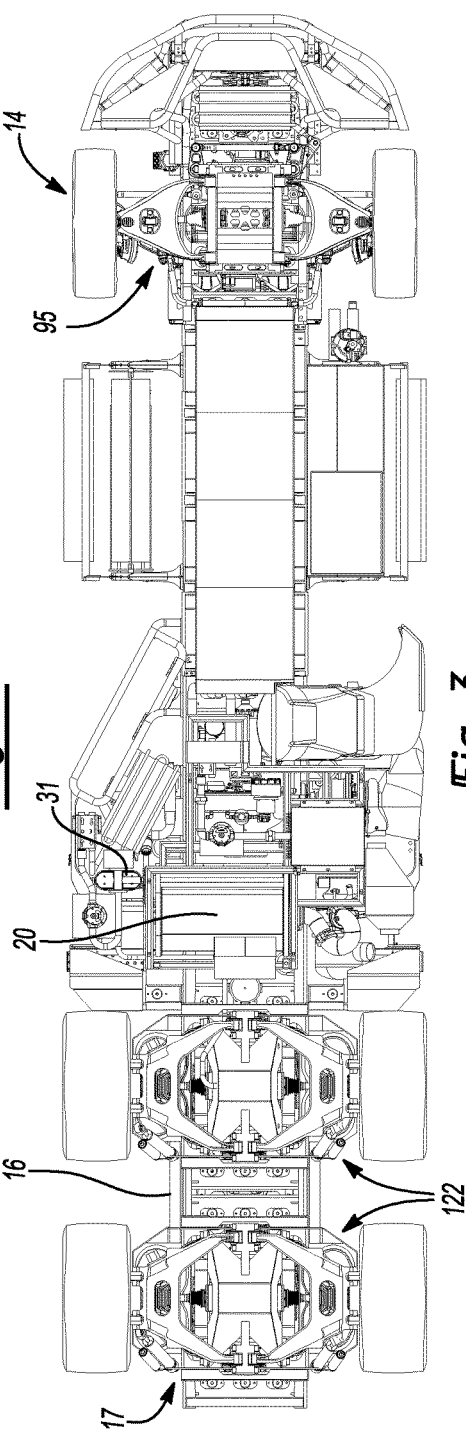
FIG. 3 is a bottom view of the chassis assembly showing front and rear suspension systems according to the disclosure.

Referring to FIGS. 2 and 3, most of the truck's heavy components may be arranged to sit at or below a frame rail of frame 16 of chassis or vehicle support structure 17, thereby lowering the center of gravity by several feet and improving anti-roll over capabilities. This may also be partially accomplished by removing the diesel engine and transmission associated with a typical class 8 truck, and manufacturing the cab 12 out of lighter, but stronger carbon fiber panels, for example. Benefits of removing the diesel engine may include a drastic reduction in greenhouse gas emissions, a larger and more aerodynamic cab and a significantly quieter ride. Furthermore, all an operator or driver may need to use to make the truck 10 go and stop may be an accelerator or electric pedal and brake pedal (no shifting or clutches). The truck's simplified operation may open up the long haul market to a whole new group of drivers.

The truck's electric motors may be powered by any suitable energy storage system (ESS) 18, such as a rechargeable battery pack that may be charged in any suitable manner. For example, the ESS 18 may include a liquid cooled 320 kWh, lithium-ion battery pack (over 30,000 lithium cells), which may be charged by an onboard turbine of a turbine assembly 20. The turbine may automatically charge the batteries of the ESS 18 when needed and eliminate the need to ever "plug-in." The turbine may produce nearly 400 kW of clean energy, for example, which may provide ample battery power to allow the truck 10 to climb a 6% grade at maximum weight at 65 MPH. When going downhill, the truck's six electric motors may be configured to absorb the braking energy normally lost and deliver it back to the batteries, thereby increasing component life, miles per gallon, safety, and freight efficiencies while eliminating noisy engine brakes and reducing the potential for runaway trucks.

When compared to a typical class 8 diesel truck, the turbine of the truck 10 may be much cleaner and more efficient. The turbine may also be fuel agnostic, meaning it can run on gasoline, diesel or natural gas.

Because the above configuration includes an electric motor at each wheel 14, the truck's control unit (described in further detail below) may provide dynamic control to each wheel 14. This may be referred to as "torque vectoring" and it is accomplished by controlling the speed and torque of each of the six wheels 14 independent of each other at any given moment. Such a 6×6 torque vectoring control system may allow for safer cornering, increased stopping power (e.g., doubled stopping power), improved traction, better tire wear and longer component life over current class 8 trucks.

The cab 12 of the truck 10 may be significantly larger than a typical cab (e.g., 30% larger), yet may be more aerodynamic and have a lower coefficient of drag than the typical cab (e.g., the co-efficient of drag may be nearly 5% lower compared to current trucks on the market). The cab 12 may also include various comfort and/or convenience features, such as a sliding mid-entry door for improved access and safety, a full size refrigerator and freezer, electric climate controlled cabin, touch screen display (e.g., 15 inch touch screen display), 4G LTE internet, over the air software updates, panoramic windshield, sunroof, two full size beds, microwave and large screen television (e.g., 42 inch television). All of these features may be powered by the ESS 18, thereby alleviating the need to idle or run a separate generator.

The truck's hardware and/or software may also be configured to provide compatibility with driverless vehicles in the future. Such technology may allow a single driver to "virtually" hitch and lead up to 5 driverless trucks 10 through a wireless vehicle network and self-driving technology. This technology could solve the driver shortage and increased freight costs facing the long haul transportation industry.

Motor Gearbox Description

Figure 4:
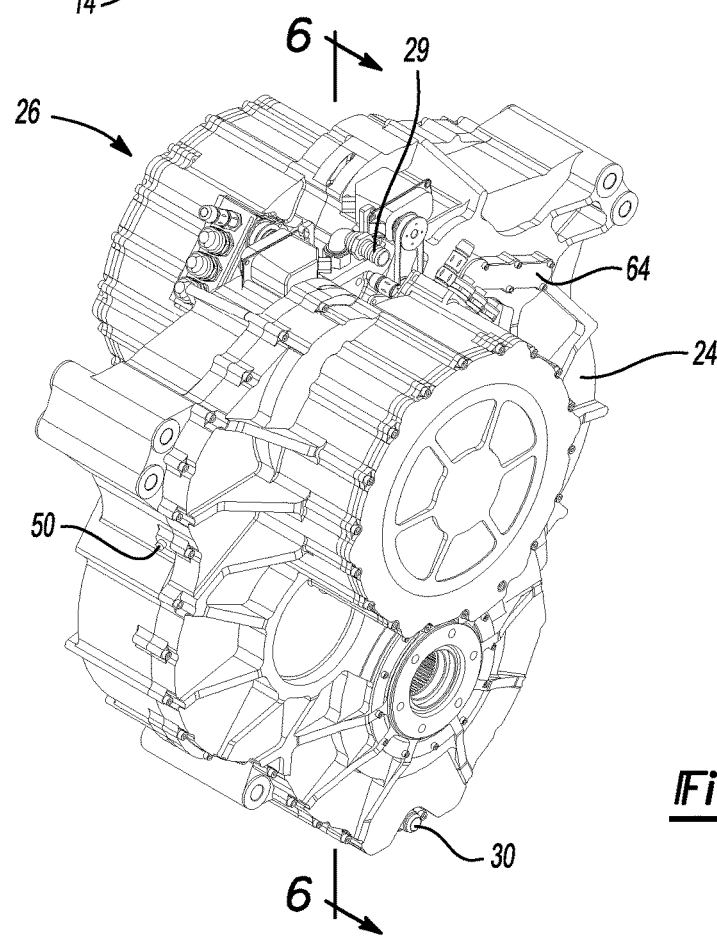
FIG. 4 is a perspective view of one of the motor gearbox assemblies, which includes an external housing.
Figure 5:
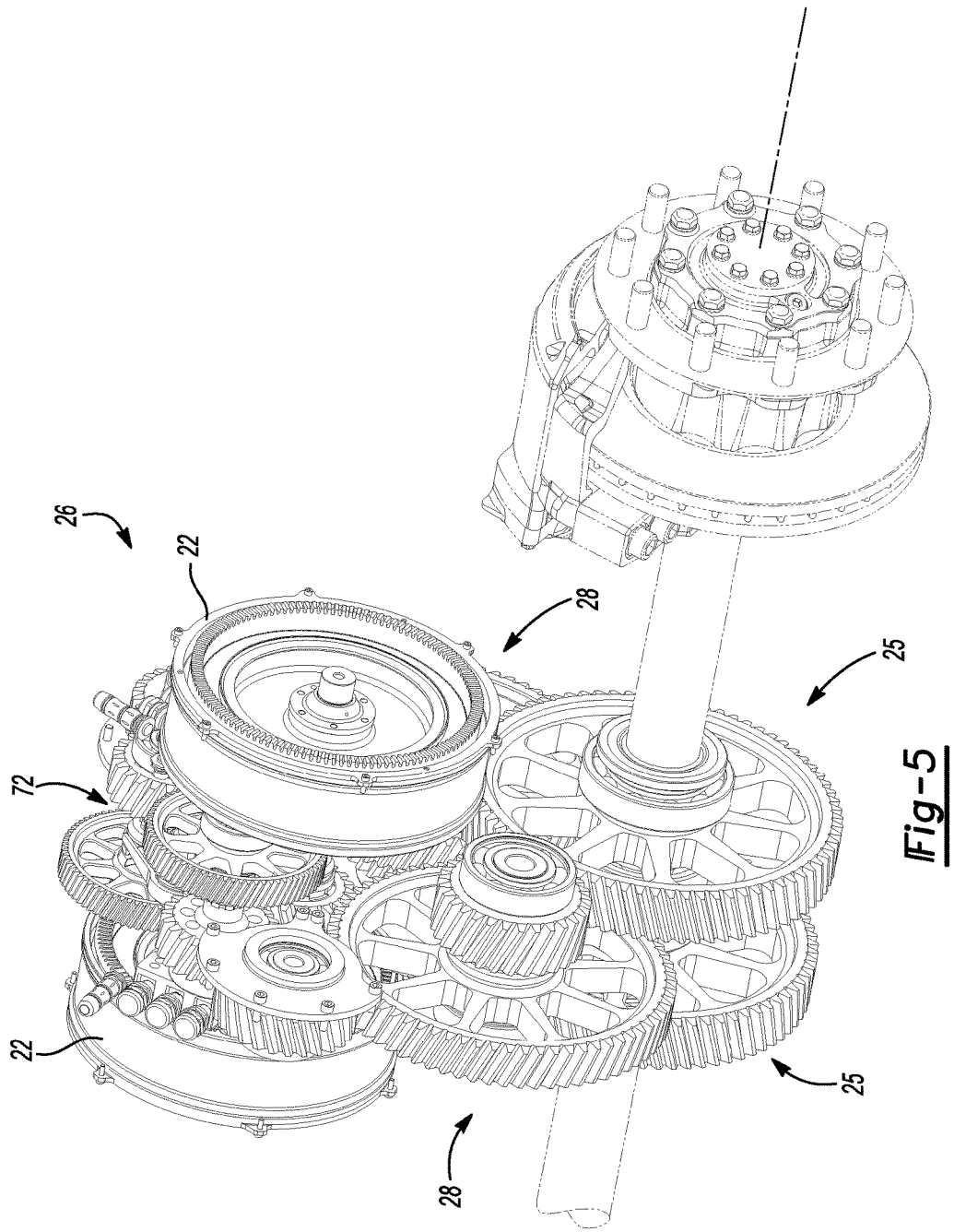
FIG. 5 is a perspective view of the motor gearbox assembly of FIG. 4, with the housing removed to show first and second independent drive systems, wherein each drive system includes an electric motor and an associated gear train connected to the motor.

Referring to FIGS. 2, 4 and 5, the electric motors mentioned above (which are identified with reference number 22 in FIG. 5) are grouped in pairs and each pair is mounted in a common motor gearbox housing 24 along with an associated gear train 25 for each motor 22 to form a dual motor gearbox assembly or dual motor gearbox 26. Each motor 22 and associated gear train 25 may be referred to as a powertrain, drive assembly, or drive system 28. With the above configuration, a single housing 24 encloses or receives two independent electric motors 22 and associated gear trains 25 that are capable of driving output wheels 14 on opposite sides of the housing 24 at independent speeds and/or directions. Furthermore, the housing 24 may be mounted on the frame 16 or other portion of the vehicle support structure 17, such as a subframe or suspension cradle that is attached to the frame 16.

The above configuration of the dual motor gearbox 26 may provide a smaller overall volume for the electric powertrains by structurally supporting the bearings, gears, electric motor rotor and stator, and shifting mechanism components in a smaller package designed to fit between opposite wheels 14, and associated wheel hubs on which the wheels 14 are mounted, of the truck 10 as shown in FIG. 2. The package design and independent nature of the dual motor gearbox 26 eliminates the need for a differential and allows the output of the motors 22 to be directly coupled to the drive wheels 14 via half-shaft direct drive drive-shafts. By eliminating large drive-shafts and differentials, greater mechanical efficiency may be achieved, and the truck 10 may be made lighter.

This design also permits full independent suspension at each axle without some of the weight and mechanical complexity that would be incurred when using a typical drive-shaft differential combination and adapting such a combination for independent suspension. Front and rear independent suspension systems according to the disclosure are explained below in detail under the headings "Front Independent Suspension Design" and "Rear Independent Suspension Design," respectively.

The two drive systems 28 of a particular motor gearbox 26 may be completely separate from each other with the exception of a forced fluid (e.g., oil) cooling and lubrication system and the structural nature of the housing 24, which are shared. Referring to FIG. 4, the housing 24 may have an inlet 29 proximate a top of the housing 24 for receiving lubricant (e.g., oil), which may be distributed over components within the housing 24 and then collected at or near a bottom portion of the housing 24. The housing 24 may have various passages and openings machined or otherwise formed therein for routing lubricant to desired locations within the housing 24, as explained below in more detail. The lubricant may exit the housing 24 through one or more outlets 30 and then be routed through a cooling and filtration assembly 31 (shown in FIG. 3), which may include a cooling unit and filter, before being returned to the housing 24 through suitable passages or conduits.

Figure 6:
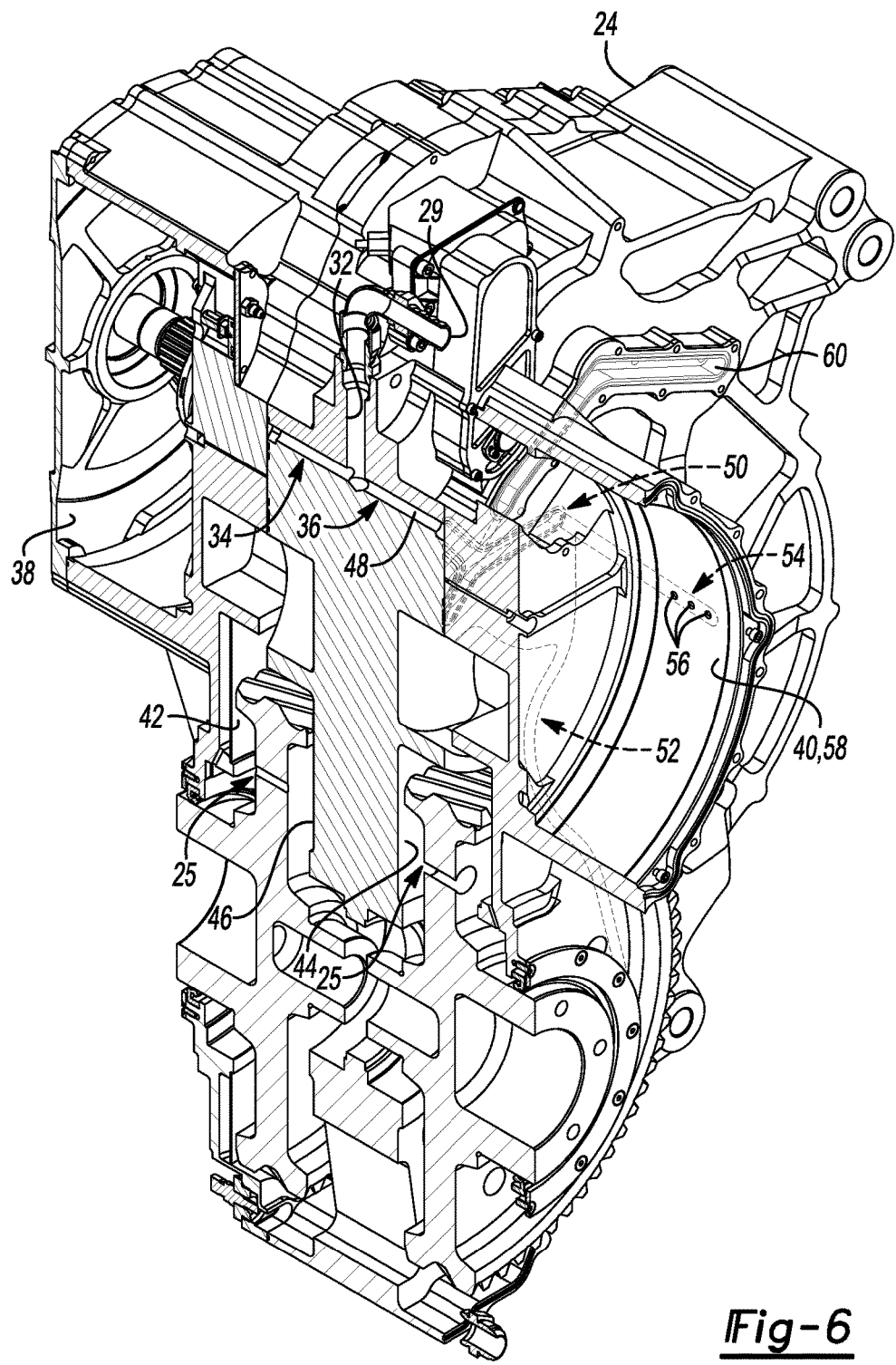
FIG. 6 is a perspective sectional view of the housing showing details of a lubrication passage arrangement formed in the housing.
Figure 7:
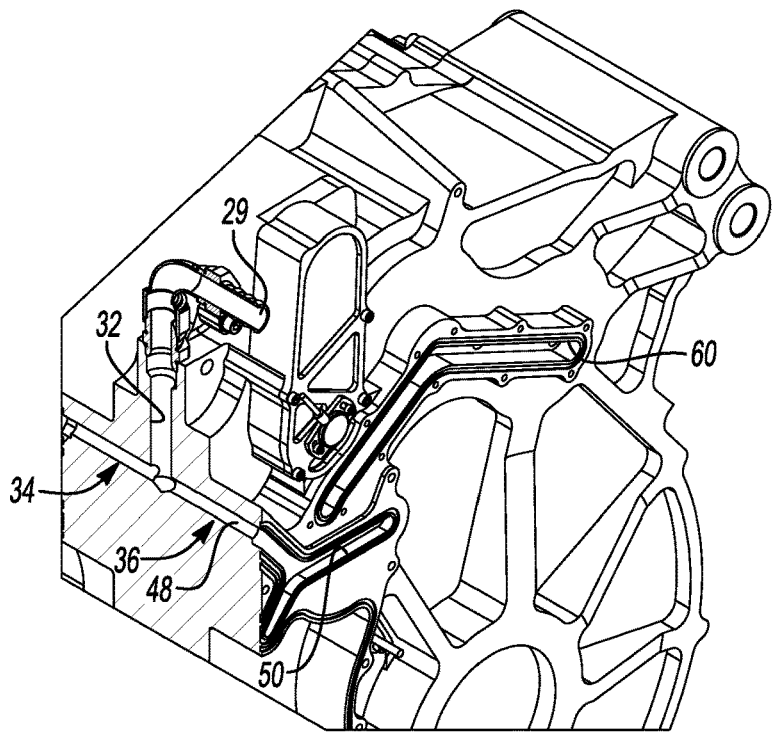
FIG. 7 is a fragmentary perspective view of the housing showing further details of the lubrication passage arrangement.
Figure 8:
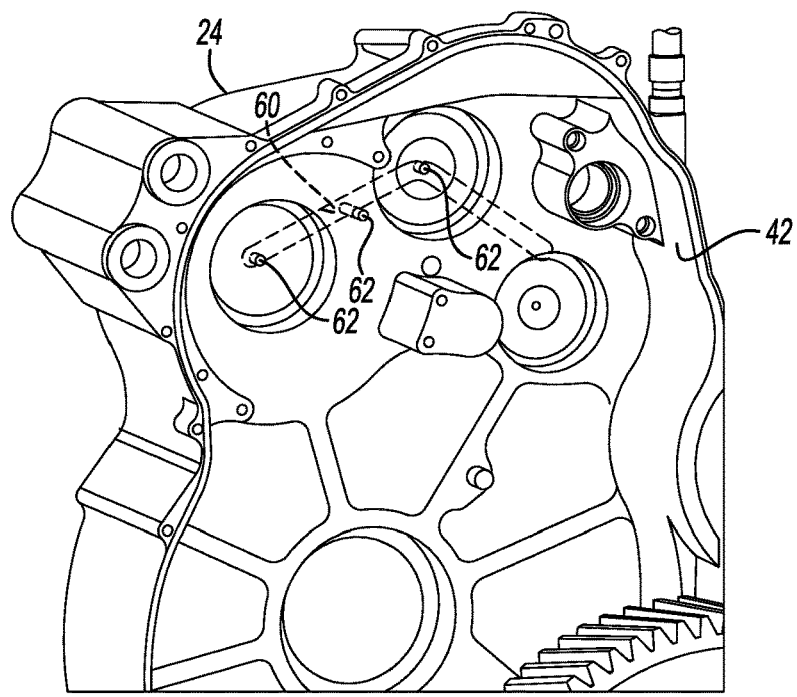
FIG. 8 is a fragmentary side perspective view of the housing showing further details of the lubrication passage arrangement.

Referring to FIGS. 6-8, additional details of an example configuration of the housing 24 for enabling or facilitating flow of lubricant are shown. Referring to FIG. 6, lubricant may flow from the inlet 29 through a main passage 32 to first and second passage arrangements 34 and 36, respectively, that supply lubricant to first and second motor receptacles 38 and 40, respectively, which each receive a motor 22, and to first and second gear train receptacles 42 and 44 respectively, which each at least partially receive a gear train 25. The first and second motor receptacles 38 and 40, respectively, are located on first and second opposite sides, respectively, of a housing central wall 46, and the first and second gear train receptacles 42 and 44, respectively, may be at least partially located on opposite sides of the housing central wall 46.

The second passage arrangement 36 will now be described in more detail, with the understanding that the first passage arrangement 34 may have the same or similar configuration, but with an inverse orientation, or partial inverse orientation, in a longitudinal direction (e.g., a rearwardly extending passage of the second passage arrangement 36 may correspond to a counterpart forwardly extending passage of the first passage arrangement 34). The second passage arrangement 36 may include multiple channels or passages formed in housing walls, and multiple openings in the housing walls that allow the passages to provide lubricant to one or both of the motors 22 in the motor receptacles 38 and 40, and one or both of the gear trains 25 in the gear train receptacles 42 and 44. For example, the second passage arrangement 36 may include a lateral passage 48 that connects to a Y-shaped longitudinally extending manifold or passage 50. The Y-shaped passage 50 feeds a downwardly extending channel or passage 52 that communicates with the second gear train receptacle 44 through multiple openings formed in one or more housing walls. In addition, the Y-shaped passage 50 extends to another lateral passage 54, which communicates with the second motor receptacle 40 through one or more openings 56 formed in a curved housing wall 58 that at least partially defines the second motor receptacle 40. Referring to FIG. 7, the Y-shaped passage 50, or another passage in communication with lateral passage 48, may also feed a V-shaped longitudinally extending passage or manifold 60, which communicates with the first gear train receptacle 42 located on the first side of the housing central wall 46 through one or more openings 62 formed in the housing central wall 46, as shown in FIG. 8. Furthermore, the V-shaped manifold 60 may be covered by a plate 64 as shown in FIG. 4.

With the above configuration, each passage arrangement 34, 36 is configured to supply lubricant on both sides of the housing central wall 46. In addition, each passage arrangement 34, 36 is configured to supply lubricant to one of the motors 22 and to at least a portion of each gear train 25. Furthermore, lubricant may be moved through each passage arrangement 34, 36 by pressure and/or gravity to lubricate and/or cool the motors 22 and associated gear trains 25.

Returning to FIG. 5, each of the gear trains 25 may include multiple gears that are configured to mesh together to transmit torque from a respective motor 22 to a respective wheel 14. Furthermore, each gear train 25 may be capable of running at multiple (e.g., two) speeds, and the gear trains 25 may have the components and capability to shift between gear ratios independent of each other. For example, each gear train 25 may include a suitable shift mechanism 72 that is controlled by an electronic control unit, which may be driven by or otherwise in communication with a vehicle control unit (e.g, a computer). With the above configuration, an automatic shifting event can be triggered for each wheel separately to limit power reduction during shifting, as explained below in further detail. The electronic control unit and/or the vehicle control unit may also control the motors 22 and/or other components of the motor gearbox 26.

Each of the above mentioned control units may include suitable hardware and/or software, such as one or more processors (e.g., one or more microprocessors, microcontrollers and/or programmable digital signal processors) in communication with, or configured to communicate with, one or more storage devices or media including computer readable program instructions that are executable by the one or more processors so that the control unit may perform particular algorithms represented by the functions and/or operations described herein. Each control unit may also, or instead, include one or more application specific integrated circuits, programmable gate arrays or programmable array logic, programmable logic devices, or digital signal processors.

By packaging the motors 22 and gear trains 25 in a housing 24 that can fit between opposite wheels 14 of the truck 10, a similar arrangement can be applied to each axle pair along the vehicle 10. This effectively reduces the power requirement of each individual motor 22 by dividing the driving load between all of the motors. As a result, several smaller motors with less mechanical losses can be used instead of a single large motor with more losses. Furthermore, when combined with independent control of these motors, unique control and performance gains are made available.

Figure 9:
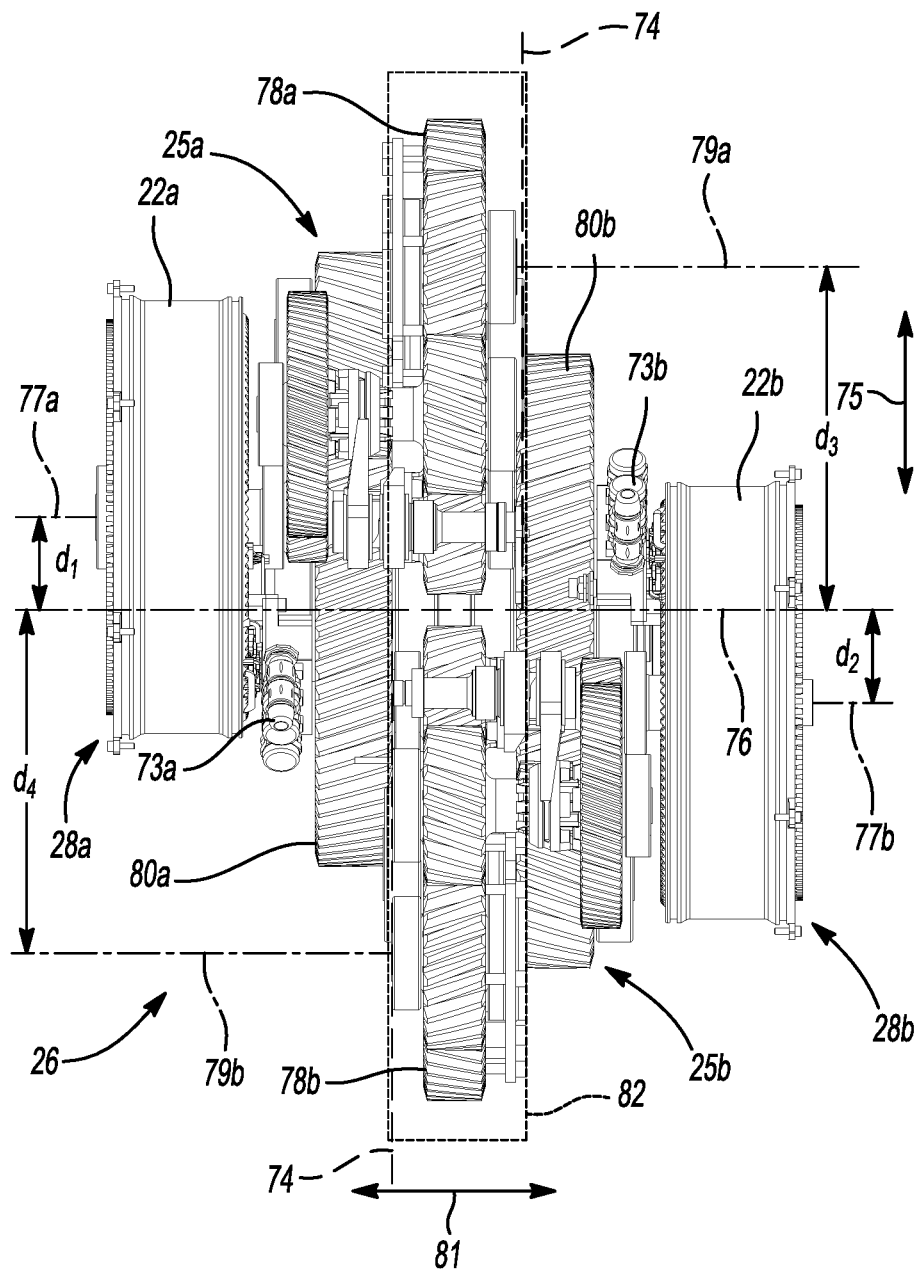
FIG. 9 is a top view of the first and second drive systems of FIG. 5.

Referring to FIG. 9, additional details of the powertrains or drive systems 28 will now be described. FIG. 9 shows first and second drive systems 28a and 28b, respectively, of a motor gearbox 26, with the housing 24 removed. The first drive system 28a includes first motor 22a and associated first gear train 25a, and the second drive system 28b includes second motor 22b and associated second gear train 25b. Each drive system 28a, 28b also includes suitable inputs or connections 73a, 73b for receiving electrical power (e.g., from the ESS 18) and/or control signals, and for providing the electrical power and/or control signals to the associated motor 22a, 22b and/or shift mechanisms 72. In addition, the gear trains 25a and 25b may be positioned at least partially between the motors 22a and 22b. In the embodiment shown in FIG. 9, the gear trains 25a and 25b are entirely disposed laterally between the motors 22a and 22b. Furthermore, staggered dividing line 74 approximately indicates general separation or division of the drive systems 28a and 28b.

As shown in FIG. 9, at least portions of the drive systems 28a, 28b may have generally inverse orientations in a longitudinal direction 75 of the truck 10 and with respect to a laterally extending, central plane 76 of the motor gearbox 26. In other words, at least a portion of one drive system 28a or 28b may have a generally inverse orientation with respect to at least a portion of the other drive system in the longitudinal direction 75 of the truck 10. For example, the motors 22a and 22b may have generally inverse orientations with respect to each other in the longitudinal direction 75, and/or portions or all of the gear trains 25a and 25b may have generally inverse orientations with respect to each other in the longitudinal direction 75 (e.g., at least a portion of one gear train 25a may have a generally inverse orientation with respect to at least a corresponding portion of the other gear train 25b in the longitudinal direction 75). In the embodiment shown in FIG. 9, the motors 22a and 22b are offset with respect to each other in the longitudinal direction 75 and have generally inverse orientations with respect to each other, and multiple gears of the first gear train 25a each have a generally inverse orientation with respect to a corresponding gear of the second gear train 25b. In that regard, in the embodiment shown in FIG. 9, motor axis or central axis 77a of motor 22a (e.g., the axis about which the rotor of motor 22a is rotatable) is located forward of central plane 76 by a distance $d_1$, while motor axis or central axis 77b of motor 22b (e.g., the axis about which the rotor of motor 22b is rotatable) is located rearward of central plane 76 by a distance $d_2$. Likewise, an intermediate gear 78a of gear train 25a is located forward of central plane 76, while a corresponding intermediate gear 78b of gear train 25b is located rearward of central plane 76 (e.g., the central plane 76 extends between the intermediate gears 78a and 78b). In the illustrated embodiment, intermediate gear 78a is rotatable about a gear axis 79a that is located forward of the central plane 76 by a distance $d_3$, and intermediate gear 78b is rotatable about a gear axis 79b that is located rearward of the central plane 76 by a distance $d_4$. Furthermore, in the embodiment shown in FIG. 9, distance $d_1$ is equal to distance $d_2$, and distance $d_3$ is equal to distance $d_4$. Output gears 80a and 80b of the gear trains 25a and 25b, however, may be aligned along the central plane 76, and may also be axially aligned so that the corresponding wheels 14 can be axially aligned. Therefore, the output gears 80a and 80b may be aligned with each other, while the other corresponding components of the drive systems 28a and 28b may be offset with respect to each other in the longitudinal direction 75. In some embodiments, corresponding components of the drive systems 28a and 28b may be offset with respect to each other, but spaced relative to the central plane 76 by different distances.

As further shown in FIG. 9, some corresponding components of the gear trains 25a and 25b may be offset with respect to each other by greater distances in the longitudinal direction 75 than the motors 22a and 22b. For example, in the embodiment shown in FIG. 9, the central axes 77a and 77b of the motors 22a and 22b are spaced apart by a first distance equal to the sum of $d_1$ and $d_2$, while the gear axes 79a and 79b of the intermediate gears 78a and 78b are spaced apart by a second distance equal to the sum of $d_3$ and $d_4$, wherein the second distance is greater than the first distance.

It should also be noted that each drive system 28a and 28b is configured to independently drive a wheel 14 that is located on the same side of the truck 10 as the corresponding motor 22a, 22b when the motor gearbox 26 is mounted on the frame 16 or other portion of the vehicle support structure 17. Referring to FIG. 9, the first drive system 28a is configured to drive a wheel 14 (not shown) positioned proximate motor 22a and to the left of motor 22a, while the second drive system 28b is configured to drive a wheel 14 (not shown) positioned proximate motor 22b and to the right of motor 22b. In that regard, output gear 80a may be connected by a first drive shaft or drive half-shaft (not shown) to a wheel 14 located to the left of the motor 22a, and output gear 80b may be connected by a second drive shaft or drive half-shaft (not shown) to a wheel 14 located to the right of the motor 22b.

As also shown in FIG. 9, the gear trains 25a and 25b may at least partially overlap each other in a lateral direction 81 of the truck 10 (e.g., at least a portion of the gear train 25a may overlap a least a portion of the gear train 25b) so that the lateral width of the overall motor gearbox 26 may be reduced. In other words, portions of the gear trains 25a and 25b may occupy a shared volume 82 within the housing 24. For example, the intermediate gears 78a and 78b may at least partially laterally overlap each other. In the embodiment shown in FIG. 9, the intermediate gears 78a and 78b fully overlap each other so that they are aligned in the longitudinal direction 75.

With the configuration described above, the motor gearbox 26 may have a compact design. As a result, and as mentioned above, a motor gearbox 26 according to the disclosure may be positioned at each axle of the truck 10.

Motor Gearbox Control Capabilities

Figure 10:
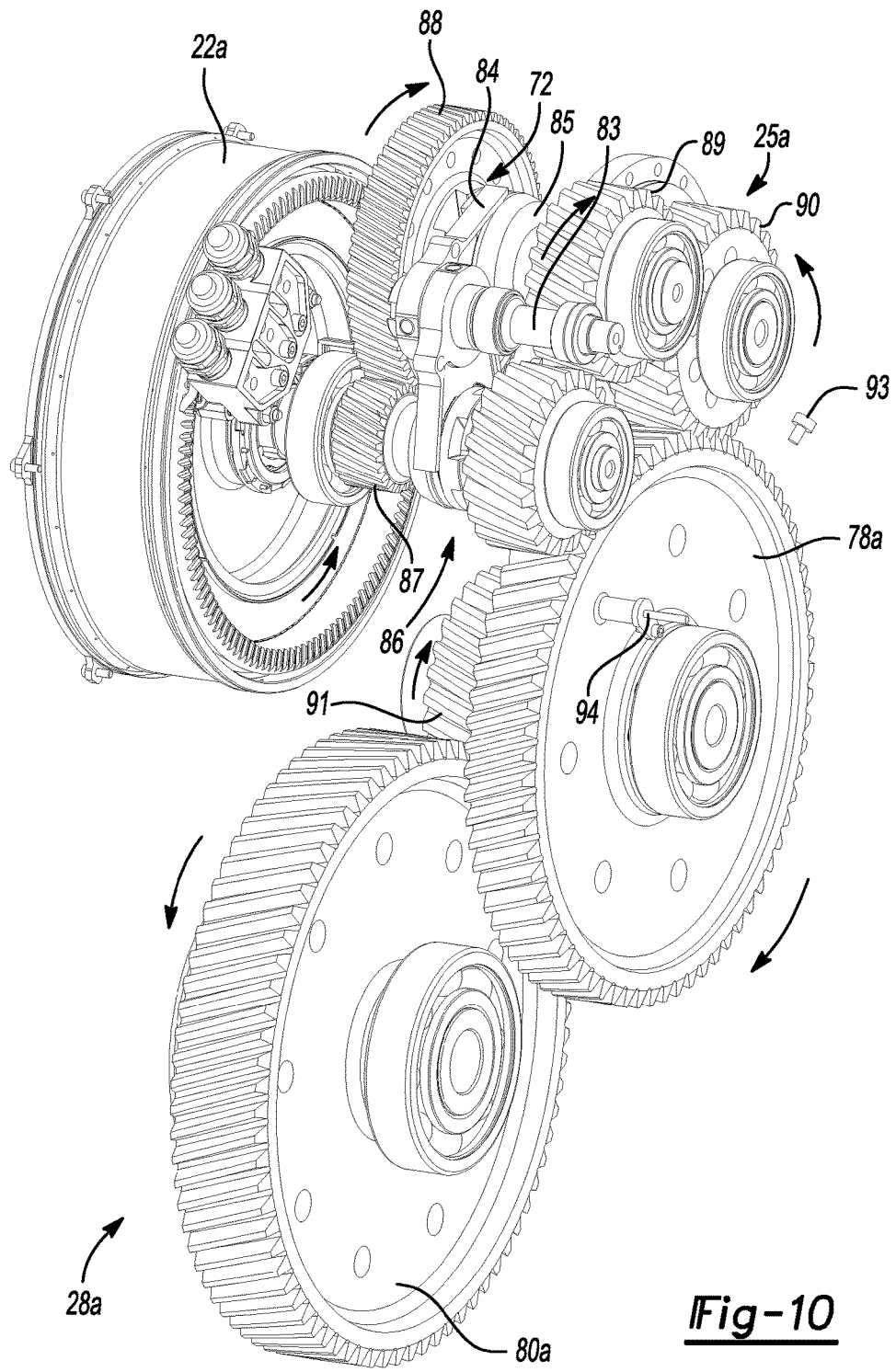
FIG. 10 is a perspective view of the first drive system of FIG. 9 operating in a low gear ratio mode.
Figure 11:
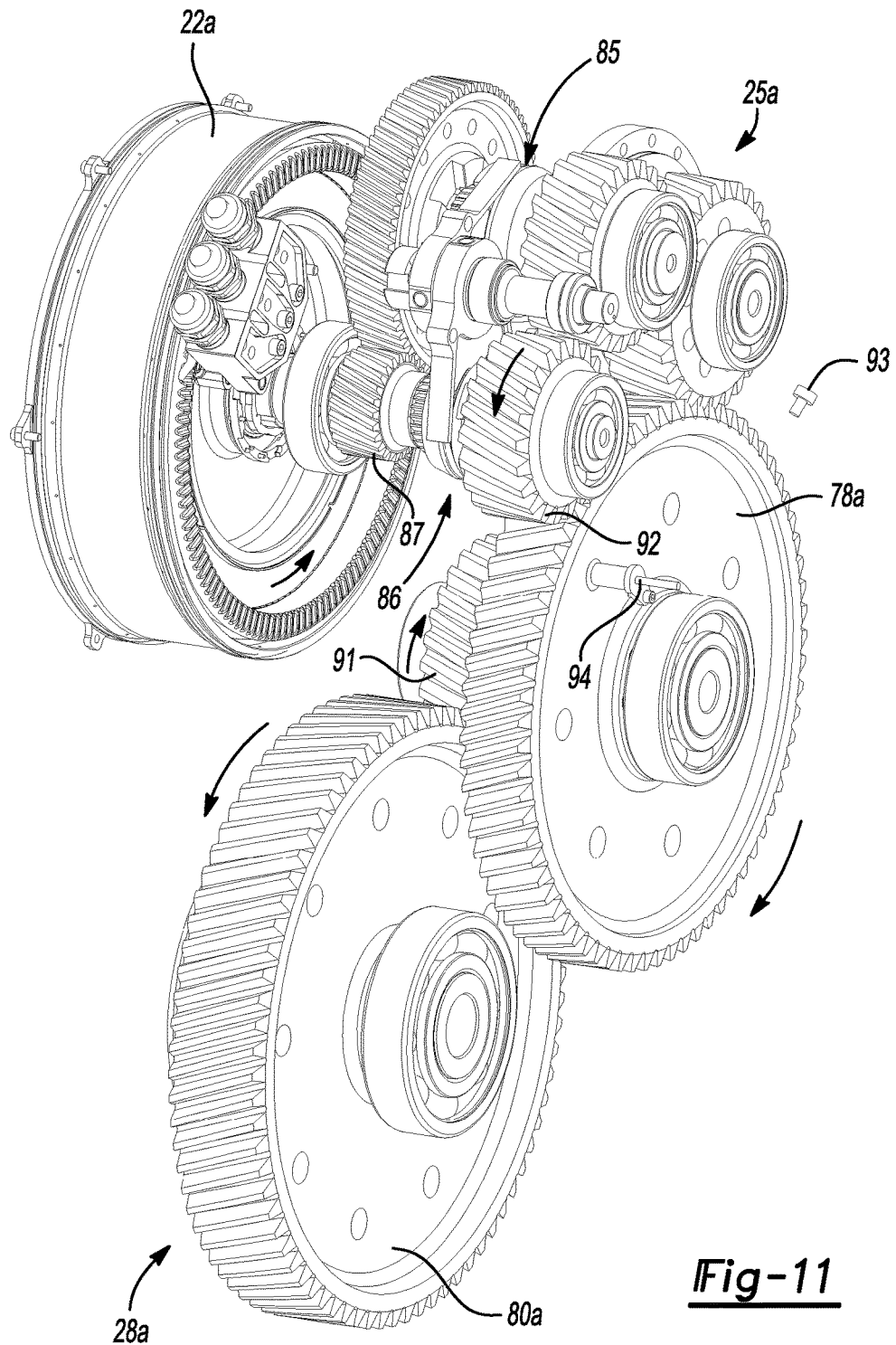
FIG. 11 is a perspective view of the first drive system of FIG. 9 operating in a high gear ratio mode.

As mentioned above, the motor gearbox design according to the present disclosure enables each gear train 25 and associated output wheel 14 to run at multiple (e.g., two) gear ratios. The output gear ratio for each drive wheel 14 can effectively be shifted independently of all other wheels 14. FIG. 10 shows the first drive system 28a operating in a low gear mode or low gear ratio mode with arrows indicating direction of rotation of the rotor of the motor 22a and gears of the gear train 25a, and FIG. 11 shows drive system 28a operating in a high gear mode or high gear ratio mode with arrows indicating direction of rotation of the rotor of the motor 22a and gears of the gear train 25a. The rotor of the motor 22a may also be rotated in an opposite direction to that shown in FIGS. 10 and 11 to thereby cause gears of the gear train 25a to rotate in opposite directions compared to the directions shown in FIGS. 10 and 11. As mentioned above, the gear train 25a may include a suitable shift mechanism 72 for shifting the gear train 25a between the gear ratio modes. For example, the shift mechanism 72 may include a barrel cam 83 that is actuated by a rotary or linear actuator that may be located at least partially external to the motor gearbox 26 and controlled by the above-mentioned electronic control unit. The barrel cam 83 may be rotated or otherwise moved to cause one or more shift selector forks 84 to move linearly and thereby cause one or more dog gears 85, 86 to engage or disengage adjacent gears in order to shift the gear train 25a between the gear ratio modes.

In the low gear ratio mode shown in FIG. 10, the dog gear 85 is in an engaged condition and the dog gear 86 is in a disengaged condition. Furthermore, in the low gear ratio mode, rotation of the rotor of motor 22a in a first direction causes input gear 87 to likewise rotate in the first direction, and the input gear 87 engages (e.g., meshes with) first intermediate or driven gear 88 and causes the first driven gear 88 to rotate in a second direction opposite the first direction. Because the dog gear 85 is in the engaged condition, the first driven gear 88 causes second intermediate or driven gear 89 to likewise rotate in the second direction. The second driven gear 89 engages (e.g., meshes with) third intermediate or driven gear 90 and causes the third driven gear 90 to rotate in the first direction, and the third driven gear 90 engages (e.g., meshes with) the intermediate gear 78a (which may also be referred to as a driven gear, e.g., fourth driven gear) and causes the intermediate gear 78a to rotate in the second direction. The intermediate gear 78a is coupled to a fifth intermediate or driven gear 91 such that rotation of the intermediate gear 78a in the second direction causes the fifth driven gear 91 to also rotate in the second direction. The fifth driven gear 91 engages (e.g., meshes with) the output gear 80a and causes the output gear to rotate in the first direction.

In the high gear ratio mode shown in FIG. 11, the dog gear 85 is in a disengaged condition and the dog gear 86 is in an engaged condition. Furthermore, in the high gear ratio mode, rotation of the rotor of motor 22a in the first direction causes the input gear 87 to likewise rotate in the first direction. Because the dog gear 86 is in the engaged condition, the input gear 87 causes sixth intermediate or driven gear 92 to likewise rotate in the first direction. The sixth driven gear 92 engages (e.g., meshes with) the intermediate gear 78a (e.g., fourth driven gear) and causes the intermediate gear 78a to rotate in the second direction. The intermediate gear 78a causes the fifth driven gear 91 to also rotate in the second direction as explained above, and the fifth driven gear 91 engages (e.g., meshes with) the output gear 80a and causes the output gear to rotate in the first direction.

During a transmission shift on a typical vehicle, the total power of a vehicle would need to be de-coupled from the transmission/drivetrain using a clutch. This results in a momentary complete loss of power during this shifting event. With the independent shifting control afforded by the motor gearbox design of the present disclosure, vehicle shifting events can be staggered among the independent gear trains around the vehicle. For example, where there are three motor gearboxes 26 (one per axle) and six independent motors 22 (one per output wheel 14 or dual wheel pair), the staggered shifting would allow one of these six gear trains 25 to be shifted at a time and then sequentially through the other gear trains. This means that instead of a total loss of power during shifting, there would only be a ⅙th reduction in power at any given time during the shift event. As a result, there is constant power, although slightly reduced, as the truck 10 shifts. Furthermore, with the above configuration, a shifting event can be controlled to be efficient and smooth, without the driver feeling it happen.

Vehicle electronic stability control (ECS), or traction control, may also be performed by braking or reducing power to wheels 14 to prevent slipping and improve traction. With independent speed and torque control of all wheels 14, it is possible to provide more torque to wheels 14 that have traction and are maintaining speeds to prevent slipping of other wheels 14. It is also possible to provide full torque vectoring during turning or high-speed avoidance. This may provide greater stability and cornering performance by distributing torque where it is needed during these maneuvers.

Independent motor 22 to wheel 14 coupling as a result of this design also allows independent regenerative braking or deceleration of the wheels 14. This means that braking force/torque could be distributed independently to each of the wheels 14 using the wheel motors 22 as generators, which may provide power back to the battery or energy storage system (e.g., ESS 18). Furthermore, the motor gearboxes 26 could be controlled to provide regenerative braking and deceleration at or near the friction limit of the tires of the truck 10. This may be possible by using wheel speed and direction sensors that are embedded in each motor gearbox 26 and sense the speed and/or direction of a gear in each gear train 25 that is directly coupled to a particular wheel 14. For example, each drive system 28a, 28b of a motor gearbox 26 may include a primary gear speed and direction sensor 93 positioned proximate the associated intermediate gear 78a, 78b (e.g., proximate an outer circumference of the intermediate gear and oriented generally transverse to the associated axis), as well as a secondary gear speed sensor 94 that may be positioned on a side of the associated intermediate gear 78a, 78b.

Front Independent Suspension Design

Figure 12:
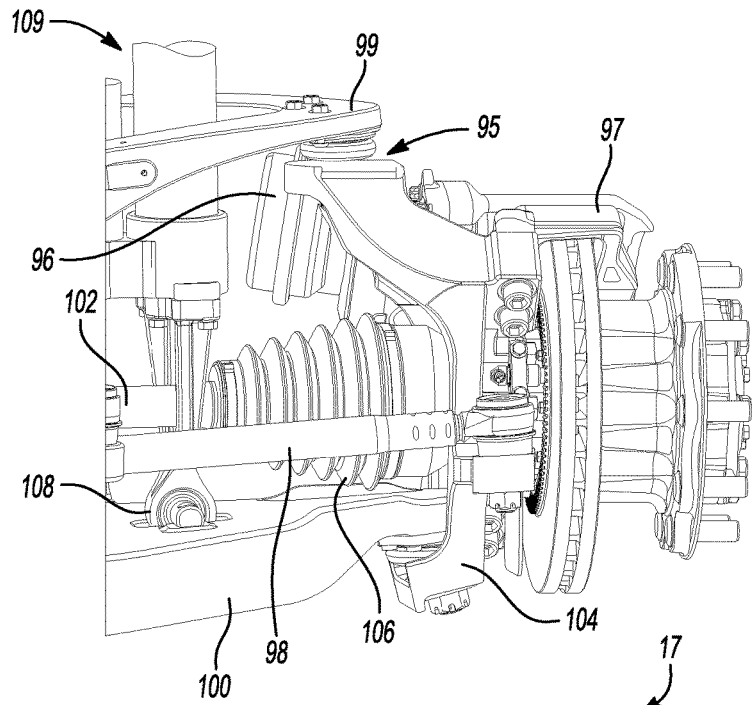
FIG. 12 is a front perspective view of a front portion of the vehicle showing a front suspension system according to the present disclosure.
Figure 13A:
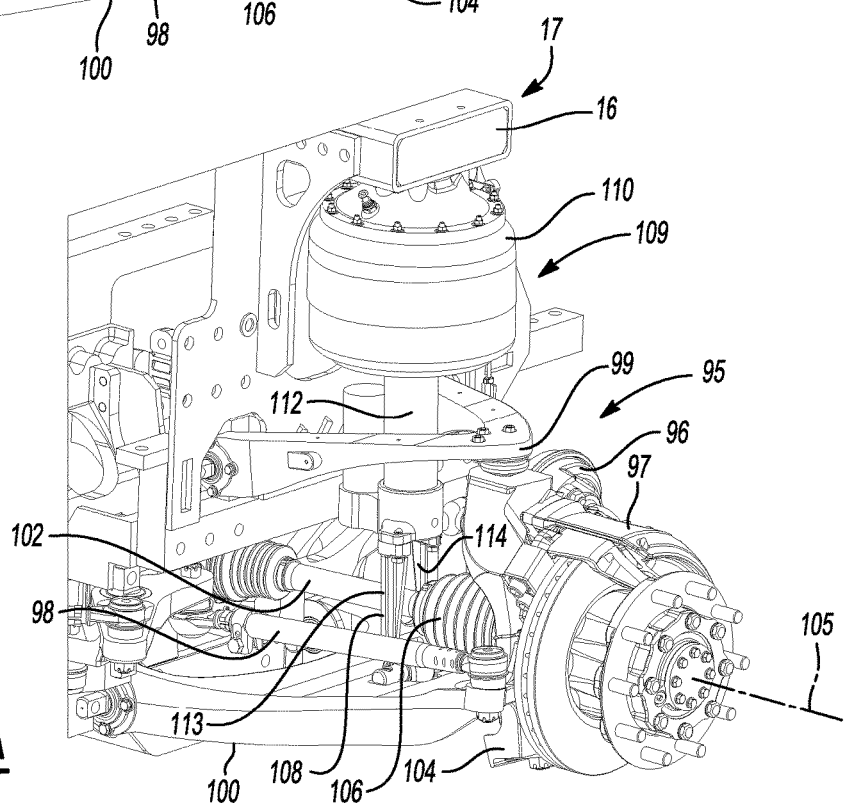
FIG. 13A is a side perspective view of the front portion of the vehicle showing additional details of the front suspension system.
Figure 13B:
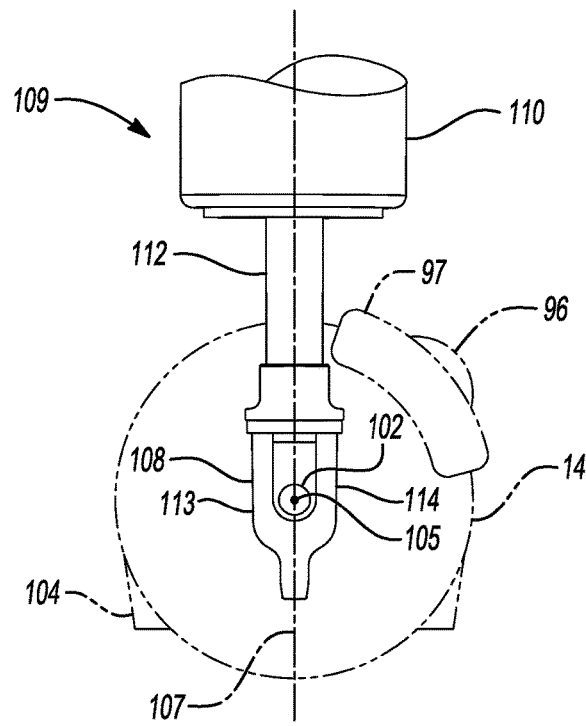
FIG. 13B is a fragmentary side view of the front portion of the vehicle showing an air spring damper assembly and yoke mount of the front suspension system aligned with a front drive shaft.

Referring to FIGS. 2, 3 and 12-13B, the truck 10 further includes front independent suspension systems 95 designed around the front motor gearbox 26 and drive half-shafts intended to drive the front wheels 14 of the vehicle 10. Typical Class 8 trucks do not have front wheel drive, so a unique design was developed to allow driving, steering and independent suspension. Furthermore, the front suspension systems 95 may be designed to accommodate an air brake system (e.g., air disc brake system) that is used for braking the front wheels 14. The front suspension system 95 for one of the front wheels 14 is shown in FIGS. 12-13B, with the understanding that the truck 10 may include the same or similar front suspension at the other front wheel 14.

Referring to FIG. 12, adding front wheel drive capability adds complexity due to the number of moving components vying for the same space near the front wheel 14. Such components may include air brake system components (e.g., an air brake chamber 96 and brake caliper assembly 97 that is actuated by the air brake chamber 96), a steering arm or link 98 of a steering system for steering the front wheel, front suspension system components (e.g., upper and lower independent suspension control arms 99 and 100, respectively) and a drive half-shaft 102 and corresponding constant velocity (CV) joint, for example. To allow those components to connect to or otherwise be associated with the front wheel 14, a custom front support member or knuckle 104 was developed for the front suspension system 95. The knuckle 104 rotatably supports the front wheel 14 and associated hub, and may serve as a direct or indirect connection or support area for various components (e.g., the knuckle 104 may be configured to support various components). For example, the steering arm 98 may be pivotally connected to the knuckle 104 in any suitable manner, such as with a knuckle mount that includes a pivot member (e.g., pivot ball) and a pivot bearing (e.g., pivot socket). Likewise, the control arms 99 and 100 of the front suspension system 95 may each be pivotally connected to the knuckle 104 in any suitable manner, such as with knuckle mounts that each include a pivot member (e.g., pivot ball) and a pivot bearing (e.g., pivot socket). As another example, the air brake chamber 96 may be mounted on the knuckle 104 or on the brake caliper assembly 97, which may be mounted on the knuckle 104. Furthermore, referring to FIGS. 13A and 13B, the air brake chamber 96 may be mounted rearward of a center (e.g., rotation axis 105) of the front wheel 14 and associated hub, and proximate or outwardly of an outer circumference of the front wheel 14, to avoid contact with the drive half-shaft 102 and CV boot 106 (which covers the CV joint), steering arm 98, and suspension control arms 99 and 100 during all steering and suspension operational situations (e.g., through full suspension travel and full steering travel of the front wheel 14).

Referring to FIG. 13B, the air brake chamber 96 may also be mounted above the rotation axis 105 of the front wheel 14 and associated hub. Likewise, the air brake chamber 96 may be mounted rearward of a vertical plane 107 that passes through the rotation axis 105 and a top portion of the front wheel 14, such that the air brake chamber 96 is mounted rearward of a top-center of the front wheel 14. For example, the air brake chamber 96 may be mounted rearward of the vertical plane 107 such that a center point of the air brake chamber 96 is positioned at an angle in the range 10° to 90° (more particularly 30° to 75°) relative to the vertical plane 107 and axis 105.

Referring to FIGS. 12-13B, the front suspension system 95 further includes a unique support member or yoke mount 108 for attaching a suspension device, such as a gas (e.g., air) spring and damper assembly 109, to the lower control arm 100. The spring and damper assembly or spring-damper assembly 109 may include a gas spring 110 (e.g., air spring) and a damper 112 axially aligned with and positioned beneath the gas spring 110. The yoke mount 108 includes first and second legs 113 and 114, respectively, that are configured to receive the drive half-shaft 102 therebetween so that the spring-damper assembly 109 may be positioned over the drive half-shaft 102 (e.g., axis of the drive half-shaft 102). With such a configuration, the drive half-shaft 102 (e.g., axis of the drive half-shaft 102) may be aligned with a yoke mount axis and spring-damper assembly axis in order to keep the drive half-shaft 102 and spring-damper assembly 109 in their ideal alignment, as shown in FIG. 13B. One of the legs (e.g., first leg 113) of the yoke mount 108 may also be configured to extend between the drive half-shaft 102 and the steering arm 98. While the yoke mount 108 may be connected to the spring-damper assembly 109 in any suitable manner, in the embodiment shown in FIGS. 13A and 13B, the first and second legs 113 and 114 are fixedly connected to the spring-damper assembly 109 at first and second spaced apart locations, respectively. Furthermore, the spring 110 may be connected to the frame 16 or other portion of the vehicle support structure 17 (e.g., subframe or suspension cradle).

Alternatively, the above-mentioned suspension device may be any suitable suspension device, such as a linear or non-linear dynamic suspension member. For example, the suspension device may include a coil spring, a magnetic suspension member and/or an electromagnetic suspension member.

The front suspension systems 95 are also configured to fit around the front motor gearbox 26, which is centered within the suspension cradle. This makes it possible to have independent front suspensions while also being able to directly drive left and right front wheels 14 independently using the electric dual motor gearbox 26 located in between the front wheels 14. In the embodiment shown in FIG. 13A, inboard ends of the control arms 99, 100 may be pivotally connected to the vehicle support structure 17 (e.g., suspension cradle or frame 16) proximate the motor gearbox 26 and the center of the truck 10.

Figure 14:
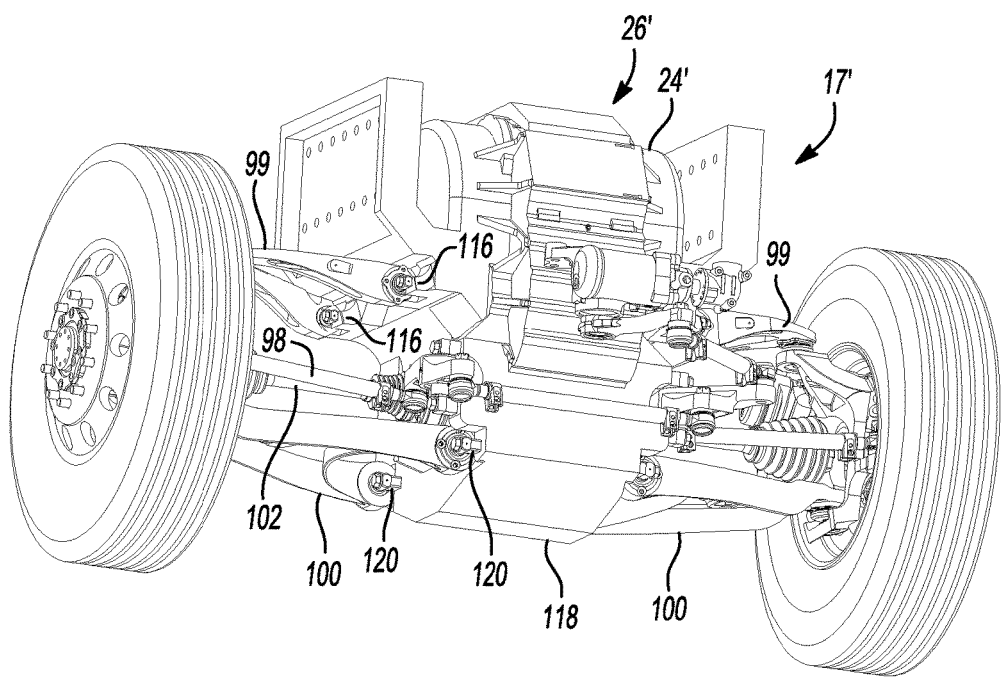
FIG. 14 is a front perspective view of an alternate embodiment of the front suspension system, showing various components of the front suspension system connected to a motor gearbox housing.

In another embodiment, the housing 24 of the front motor gearbox 26 may be connected to at least one of the control arms 99 and 100 of one or both of the front suspension systems 95. In the embodiment shown in FIG. 14, for example, front motor gearbox 26' includes an enlarged housing 24' to which the control arms 99 and 100 of right and left front suspension systems 95 are connected. In the illustrated embodiment, each of the right and left sides of an upper portion of the housing 24' has two upper, laterally projecting portions 116 to which a particular upper control arm 99 is pivotally connected. Furthermore, the housing 24' includes an enlarged lower portion 118, and each of the right and left sides of the lower portion 118 has two lower, laterally projecting portions 120 to which a particular lower control arm 100 is pivotally connected. The housing 24' may be connected to vehicle support structure 17' (e.g., front suspension cradle or frame 16) and may be made of a suitable material, such as metal (e.g, aluminum), carbon-reinforced plastic or other composite material, etc., so that the housing 24' may support the above components. With such a configuration, portions of the front suspension cradle may be omitted, so that the overall vehicle weight may be reduced. In addition, the front suspension cradle may be integrally formed with the housing 24' (e.g., molded together), as shown in FIG. 14, to further reduce vehicle weight, or the suspension cradle may be formed separately from the housing 24' and attached to the housing 24'.

Rear Independent Suspension Design

Figure 15A:
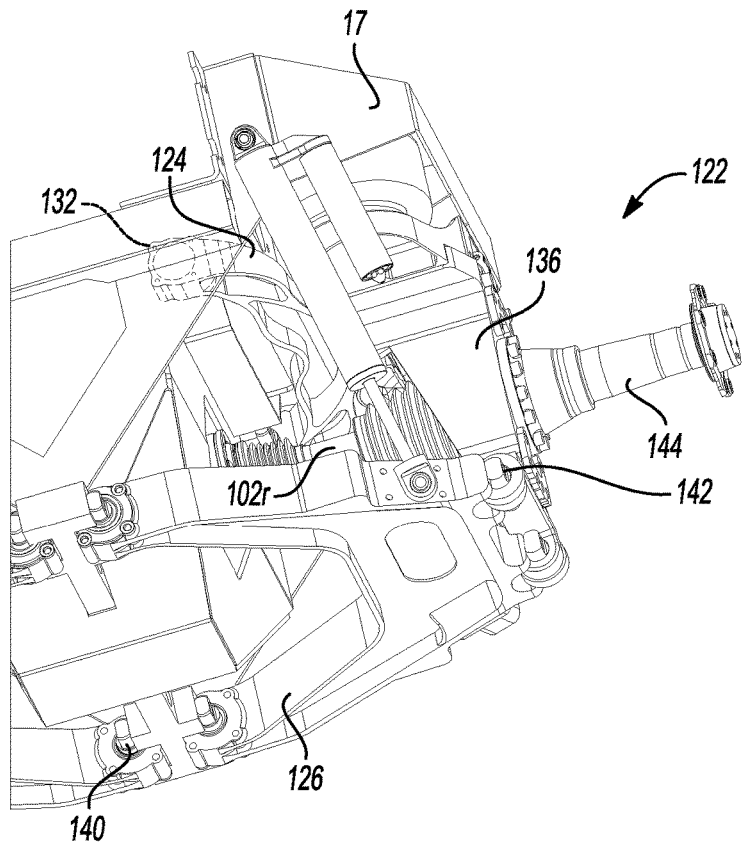
FIG. 15A is a bottom perspective view of a rear portion of the vehicle showing a rear suspension system according to the present disclosure.
Figure 15B:
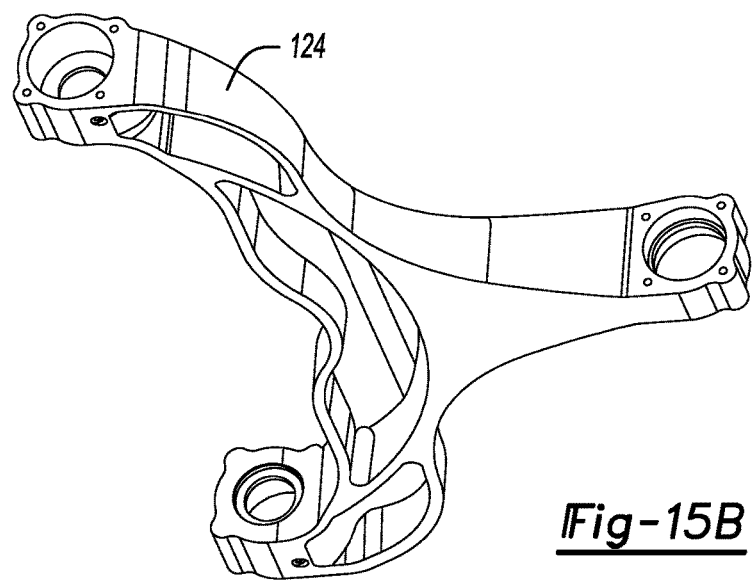
FIG. 15B is a perspective view of an upper suspension control arm of the rear suspension system shown in FIG. 15A.
Figure 16:
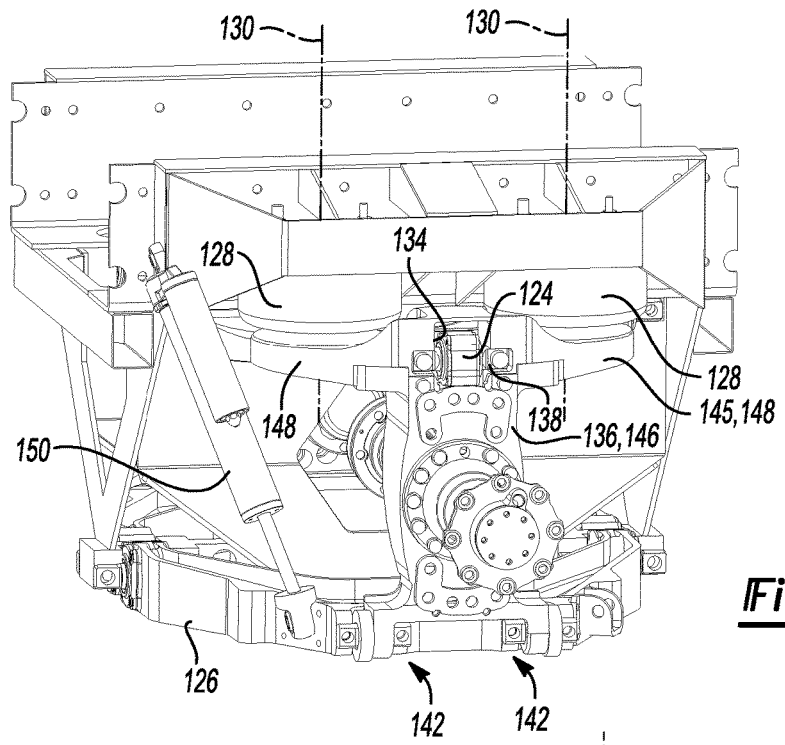
FIG. 16 is a side perspective view of the rear portion of the vehicle showing additional details of the rear suspension system.

Referring to FIGS. 3 and 15A-18, the truck 10 further includes rear independent suspension systems 122 and associated cradles that are configured to provide independent suspension at each rear wheel 14, while also allowing direct independent driving of the rear wheels 14 using a dual motor gearbox 26 located between the wheels 14 at each of two rear axle locations. The rear suspension systems 122 may also be configured to enable accurate alignment (e.g., coaxial alignment) of drive half-shafts 102r connected to each rear motor gearbox 26, so that the output gears 80 of each rear motor gearbox 26 may be coaxially aligned with corresponding rear wheels 14 when the drive half-shafts 102r are positioned in a horizontal orientation. With such a configuration, the rear suspension systems 122 may provide improved suspension travel and feel. The rear suspension system 122 for one of the rear wheels 14 is shown in FIGS. 15A-16, with the understanding that the truck 10 may include the same or similar rear suspension at each rear wheel 14.

Referring to FIGS. 15A-16, the rear suspension system 122 includes upper and lower control arms 124 and 126, respectively, that may be configured to have inboard pivot points or axes located as close to the center of the truck 10 as possible (around an associated motor gearbox 26) to allow the most accurate suspension travel from full jounce to rebound (i.e., full up and down movement). Likewise, as explained below in detail, the control arms 124 and 126 may also be configured to have outboard pivot points or axes as close to an associated rear tire as possible. In addition, the rear suspension system 122 may include one or more suspension devices, such as gas suspension members or air springs 128 that are each oriented along an upright axis 130 (e.g., central axis) and connected to the vehicle support structure 17 (e.g., suspension cradle or frame 16). Alternatively, each suspension device may comprise any suitable suspension device, such as a linear or non-linear dynamic suspension member. For example, each suspension device may comprise a coil spring, a magnetic suspension member and/or an electromagnetic suspension member.

In the embodiment shown in FIGS. 15A-16, the upper control arm 124 includes a first or inboard portion having two arms, and a second or outboard portion formed as a single arm. Inboard ends of the upper control arm 124 are each pivotally attached to the vehicle support structure 17 (e.g., suspension cradle or frame 16), such as with a cradle mount 132 (e.g., pivot member or rod and pivot bearing), at a location around the exterior of the motor gearbox 26 and proximate the center of the truck 10. The outboard portion of the upper control arm 124 may pass between two air springs 128 and/or between the associated upright axes 130 of the air springs 128. In the embodiment shown in FIG. 16, the outboard portion of the upper control arm 124 is centered between the upright axes 130 of the air springs 128. In addition, the outboard portion of the upper control arm 124 extends into an opening 134 in a rear support member or knuckle 136, to which the two air springs 128 are mounted. The outboard portion further includes a single wheel side end or outboard end that may be pivotally connected to the knuckle 136, such as with a knuckle mount 138 (e.g., pivot member or rod and pivot bearing), at a location proximate an outboard side of the knuckle 136 (e.g., as close to a corresponding rear wheel as possible). For example, the outboard end of the upper control arm 124 may be pivotally connected to an outboard face of the knuckle 136. As a more detailed example, the outboard end of the upper control arm 124 may be pivotally connected to the knuckle 136 with a knuckle mount 138 including a pivot member, such as a pivot rod, that is fixedly received in a channel or notch formed in the outboard face of the knuckle 136 and about which the upper control arm 124 is pivotable.

The lower control arm 126 includes an inboard portion having two inboard ends that are each pivotally attached to the vehicle support structure 17 (e.g., suspension cradle or frame 16), such as with a cradle mount 140 (e.g., pivot member or rod and pivot bearing), at a location beneath the motor gearbox 26. In the embodiment shown in FIG. 15A, the cradle mounts 140 of the lower control arm 126 are located closer to the center of the truck 10 than the cradle mounts 132 of the upper control arm 124. Such a configuration may provide improved suspension response, while also providing improved suspension travel. In addition, the lower control arm 126 includes an outboard portion that may have two wheel side or outboard side connection locations that are each supported by and pivotally attached to the knuckle 136 (e.g., at a lower end of the knuckle 136), such as with a knuckle mount 142 (e.g., pivot member or rod and pivot bearing).

Referring to FIG. 15A, the knuckle 136 is also configured to rotatably support a rear wheel 14 (e.g., dual wheel pair). For example, the knuckle 136 may be attached to a wheel spindle 144 that supports a rear wheel 14 (e.g., the wheel spindle 144 may be attached to a hub on which the rear wheel 14 is mounted).

In the embodiment shown in FIG. 16, the knuckle 136 includes upper and lower portions 145 and 146, respectively. Furthermore, the knuckle 136 may be made as a single piece or multiple pieces that are joined together, such as by welding. The upper portion 145 of the knuckle 136 may include support sections 148 that project outwardly with respect to the lower portion 146, and the opening 134 formed in the knuckle 136 may extend through a central portion of the upper portion 145 and between the support sections 148. The configuration of the knuckle 136 enables two air springs 128, or other suspension devices, to be mounted to a top of the knuckle (e.g., the upper portion 145) and further allows the second portion of the upper control arm 124 to pass through a majority or all of the knuckle 136 to the outside or outboard face of the knuckle 136. In addition, the second portion of the upper control arm 124 may be aligned with a central vertical axis of the knuckle 136 and an axis of the wheel 14 and associated hub.

The rear suspension system 122 may further include one or more shock absorbers or dampers 150 connected between the lower control arm 126 and the vehicle support structure 17, such as the suspension cradle or frame 16. In the embodiment shown in FIG. 16, the damper 150 is positioned rearward of the air springs 128 and knuckle 136.

With the above configuration, the rear suspension system 122 may handle significant loads, while maintaining a low profile. For example, the air springs 128 may cooperate to effectively handle large loads, yet each air spring 128 may be sized to fit between the frame rail of the frame 16 and an associated rear tire. Furthermore, the upper control arm 124 and knuckle 136 may cooperate to keep loads centered on the associated rear drive half-shaft 102r.

Figure 17:
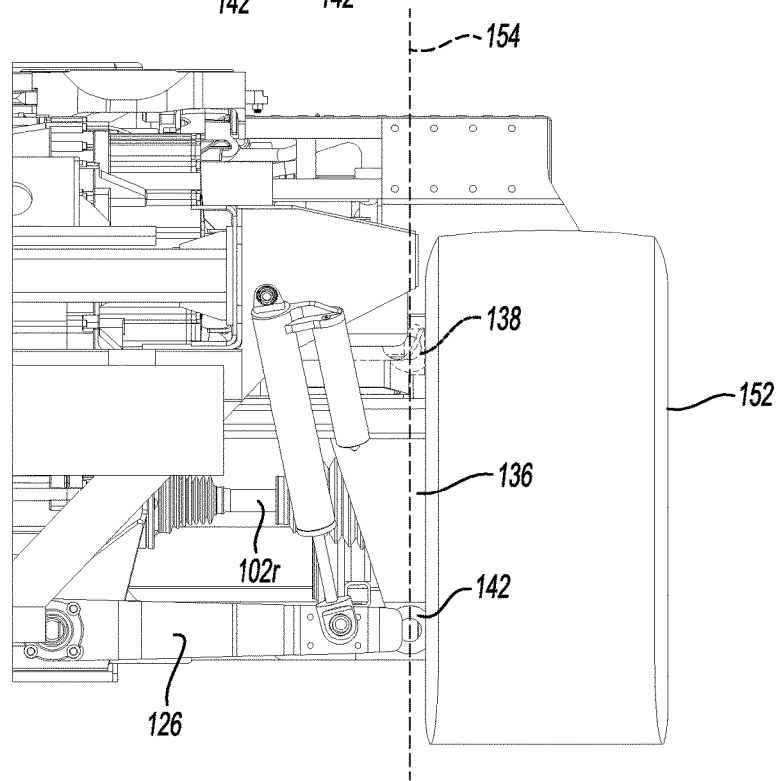
FIG. 17 is a rear end view of the vehicle showing a knuckle of the rear suspension system and upper and lower suspension control arms connected to the knuckle proximate a right rear tire.

Referring to FIG. 17, outboard portions or ends of the upper and lower control arms 124 and 126, respectively, may be pivotally connected to the knuckle 136 proximate rear tire 152 and associated wheel 14. For example, the outboard ends of the control arms 124 and 126 may be pivotally connected to the knuckle 136 as close to the tire 152 as possible (e.g., within 15 cm of an inboard face of the tire 152, or 10 cm or less of the inboard face of the tire 152). Furthermore, connection locations (e.g., pivot point or pivot axis locations) of the outboard portions of the control arms 124 and 126 with the knuckle 136 may be generally vertically aligned with each other, when viewed in the longitudinal direction 75 of the truck 10. In other words, connection locations of the outboard portions of the control arms 124 and 126 with the knuckle 136 may fall generally within a vertical plane 154 that is oriented in the longitudinal direction 75 of the truck 10. For example, the outboard side mount 138 of the upper control arm 124 may be vertically aligned with the outboard side mounts 142 of the lower control arm 126, when viewed in the longitudinal direction 75, such that the outboard side mount 138 of the upper control arm 124 and the outboard side mounts 142 of the lower control arm 126 are located in the vertical plane 154. With the above configuration of the knuckle 136 and corresponding connections to the control arms 124 and 126, the tire 152 and associated wheel 14 may be able to maintain close to a vertical orientation with respect to a road surface through the full travel range of the rear suspension system 122. As a result, the rear suspension system 122 may provide improved tracking of the tire 152.

Figure 18:
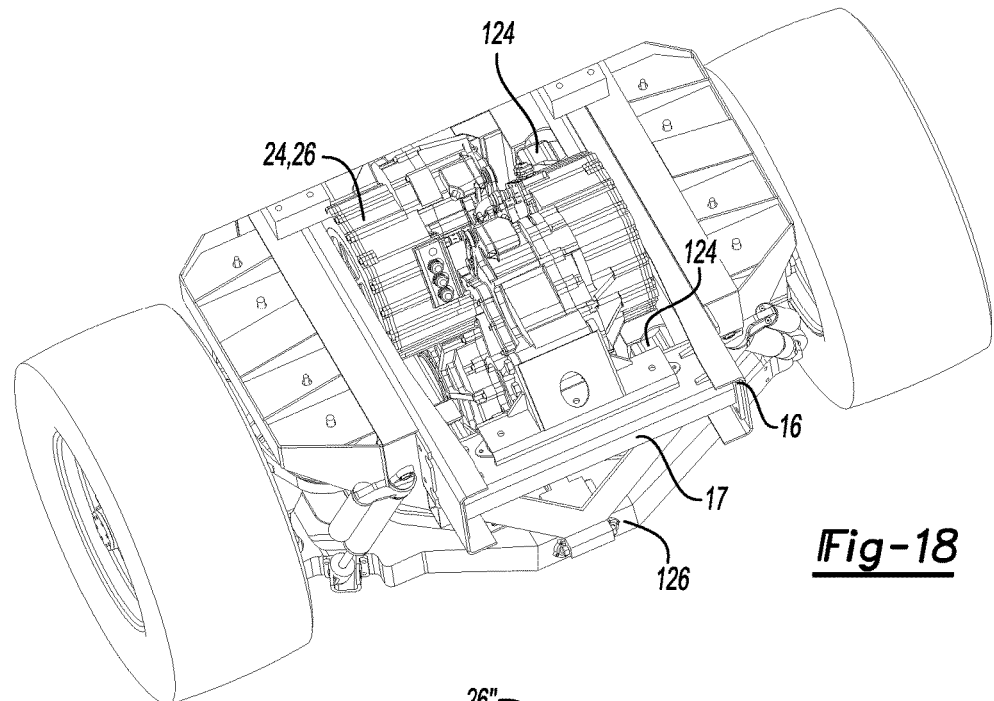
FIG. 18 is a top perspective view of a rear end of the vehicle showing further details of the rear suspension system and a dual motor gearbox assembly positioned between two rear wheels and associated tires.
Figure 19:
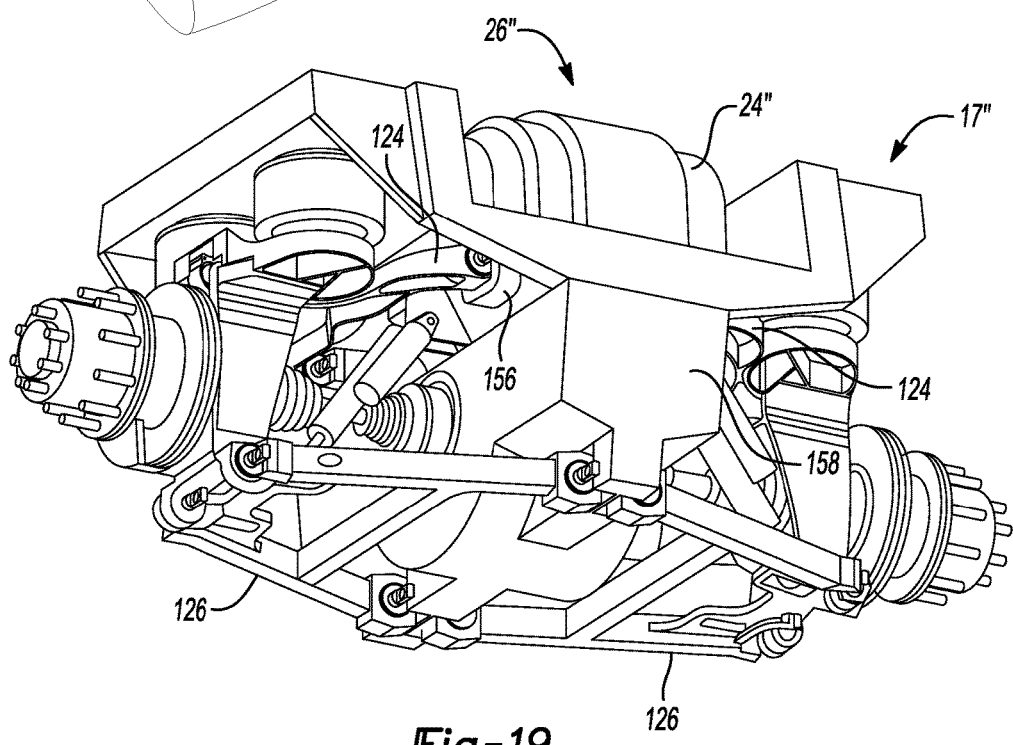
FIG. 19 is a bottom perspective view of an alternate embodiment of the rear suspension system, showing various components of the rear suspension system connected to a motor gearbox housing.

FIG. 18 shows the inboard portions or ends of the upper and lower control arms 124 and 126, respectively, pivotally connected to the vehicle support structure 17 (e.g., suspension cradle or frame 16) proximate the center of the truck 10 and motor gearbox 26. In another embodiment, inboard portions or ends of one or both of the control arms 124 and 126 of each rear suspension system 122 for a particular rear axle may be pivotally connected to the housing 24 of the associated motor gearbox 26. In the embodiment shown in FIG. 19, for example, motor gearbox 26" includes an enlarged housing 24" to which the control arms 124 and 126 of aligned rear suspension systems 122 are connected. In the illustrated embodiment, each of the right and left sides of an upper portion of the housing 24" has two upper, laterally projecting portions 156 to which a particular upper control arm 124 is pivotally connected. Furthermore, the housing 24" includes an elongated lower portion 158 to which the lower control arms 126 are pivotally connected. The housing 24" may be connected to vehicle support structure 17" (e.g., suspension cradle or frame 16) and may be made of a suitable material, such as metal (e.g, aluminum), carbon-reinforced plastic or other composite material, etc., so that the housing 24" may support the above components. With such a configuration, portions of the suspension cradle may be omitted, so that the overall vehicle weight may be reduced. In addition, the suspension cradle may be integrally formed with the housing 24" (e.g., molded together) to further reduce vehicle weight, or the suspension cradle may be formed separately from the housing 24" and attached to the housing 24".

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A rear suspension system for a vehicle, the rear suspension system comprising:
    a knuckle for supporting a rear wheel of the vehicle, the knuckle defining an opening that extends laterally through the knuckle;
    two suspension devices configured to be connected to the vehicle and an upper portion of the knuckle, such that each suspension device is oriented along an upright axis when the rear suspension system is mounted on the vehicle; and
    a control arm having a first portion configured to he connected to the vehicle and a second portion configured to extend between the axes of the suspension devices and directly into the opening of the knuckle when the rear suspension system is mounted on the vehicle, wherein the second portion of the control arm is connectable to a laterally facing outboard face of the knuckle when the rear suspension system is mounted on the vehicle.

2. The rear suspension system of claim 1 wherein each suspension device comprises a gas suspension member.

3. The rear suspension system of claim 2 wherein each gas suspension member comprises an air spring.

4. The rear suspension system of claim 1 wherein the second portion of the control arm is configured to extend between the suspension devices when the rear suspension system is mounted on the vehicle.

5. The rear suspension system of claim 1 wherein the second portion of the control arm is connectable to the knuckle with a pivot member.

6. The rear suspension system of claim 5 wherein the knuckle has a notch formed in the outboard face, and the notch is configured to receive the pivot member.

7. The rear suspension system of claim 1 wherein the control arm is an upper control arm, and the rear suspension system further comprises a lower control arm having a first portion configured to be connected to the vehicle and a second portion configured to be connected to a lower end of the knuckle such that connection locations of the second portions of the control arms with the knuckle are generally vertically aligned with each other, when viewed in a longitudinal direction of the vehicle, and positioned proximate a tire of the vehicle when the rear suspension system is mounted on the vehicle.

8. The rear suspension system of claim 7 wherein the vehicle includes a motor gearbox assembly including a motor for driving the rear wheel in a travel direction, a gear train associated with the motor, and a housing that receives the motor and the gear train, and wherein at least one of the lower and upper control arms is attachable to the housing when the rear suspension system is mounted on the vehicle.

9. The rear suspension system of claim 8 wherein the gear train is connectable to a drive shaft that is connected to the rear wheel.

10. The rear suspension system of claim 7 further comprising a damper member adapted to be connected to the lower control arm and the vehicle.

11. The rear suspension system of claim 1 wherein the vehicle includes a motor gearbox assembly including a motor for driving the rear wheel, a gear train associated with the motor, and a housing that receives the motor and the gear train, and wherein the control arm is attachable to the housing when the rear suspension system is mounted on the vehicle.

12. The rear suspension system of claim 1 wherein the second portion of the control arm is configured to be pivotally connected to the knuckle with a mounting member that is separate from the control arm.

13. The rear suspension system of claim 1 wherein the knuckle comprises multiple pieces that are joined together.

14. A vehicle comprising:
    a vehicle support structure;
    first and second rear wheels that are each rotatable with respect to the vehicle support structure; and
    first and second independent rear suspension systems associated with the first and second rear wheels, respectively, each rear suspension system including:
        a knuckle that supports one of the rear wheels, the knuckle defining an opening that extends laterally through the knuckle;
        two suspension devices connected to the vehicle support structure and an upper portion of the knuckle, such that each suspension device is oriented along an axis; and
        a control arm having a first portion supported by the vehicle support structure and a second portion that extends between the axes and directly into the opening of the knuckle, wherein the second portion of the control arm is connected to a laterally facing outboard face of the knuckle with a mounting member that is separate from the control arm.

15. The vehicle of claim 14 wherein each suspension device comprises a gas suspension member.

16. The vehicle of claim 14 wherein, for each rear suspension system, the second portion of the control arm extends between the suspension devices.

17. The vehicle of claim 14 further comprising first and second tires associated with the first and second rear wheels, respectively, wherein the control arm of each rear suspension system is an upper control arm, and each rear suspension system further comprises a lower control arm having a first portion connected to the vehicle support structure and a second portion connected to a lower end of the knuckle such that, for each rear suspension system, connection locations of the second portions of the control arms with the knuckle are generally vertically aligned with each other, when viewed in a longitudinal direction of the vehicle, and positioned proximate one of the tires.

18. The vehicle of claim 17 further comprising a motor gearbox assembly including first and second motors for driving the first and second rear wheels, respectively, in a travel direction, first and second gear trains associated with the first and second motors, respectively, and a housing that is connected to the vehicle support structure and that receives the motors and the gear trains, and wherein at least one of the lower and upper control arms of each rear suspension system is attached to the housing.

19. The vehicle of claim 14 further comprising a motor gearbox assembly including first and second motors for driving the first and second rear wheels, respectively, in a travel direction, first and second gear trains associated with the first and second motors, respectively, and a housing that is connected to the vehicle support structure and that receives the motors and the gear trains, and wherein the control arm of each rear suspension system is attached to the housing.

20. The vehicle of claim 13 further comprising first and second drive shafts connected to the first and second rear wheels, respectively, and a motor gearbox assembly connected to the first and second drive shafts and configured to drive the first and second rear wheels in a travel direction, the motor gearbox assembly including two independent drive systems that each include an electric motor and an associated gear train, the motor gearbox assembly further including a housing that receives the motors and the gear trains, wherein at least one of the control arms is connected to the housing.

21. The vehicle of claim 14 wherein each knuckle comprises multiple pieces that are joined together.

22. A rear suspension system for a vehicle having a rear wheel and tire, the rear suspension system comprising:
a knuckle for supporting the rear wheel, an upper portion of the knuckle defining an opening that extends laterally through the knuckle;
an upper control arm having a first portion configured to be connected to the vehicle and a second portion configured to extend directly into the opening of the knuckle and be connected to the upper portion of the knuckle at a first connection location, wherein the second portion of the upper control arm is connectable to a laterally facing outboard face of the knuckle when the rear suspension system is mounted on the vehicle; and
a lower control arm having a first portion configured to be connected to the vehicle and a second portion configured to be connected to a lower portion of the knuckle at a second connection location such that the first and second connection locations are generally vertically aligned with each other, when viewed in a longitudinal direction of the vehicle, and positioned proximate the tire of the vehicle when the rear suspension system is mounted on the vehicle.

23. The rear suspension system of claim 22 wherein the second portion of the upper control arm is connectable to the knuckle with a pivot member, and the knuckle has a notch formed in the outboard face that is configured to receive the pivot member, and wherein the notch is formed adjacent to the opening.

24. The rear suspension system of claim 22 wherein the knuckle comprises multiple pieces that are joined together.

* * * * *

UNITED STATES PATENT AND TRADEMARK OFFICE
CERTIFICATE OF CORRECTION

PATENT NO. : 10,336,379 B2
APPLICATION NO. : 15/366472
DATED : July 2, 2019
INVENTOR(S) : Trevor R. Milton et al.

Page 1 of 1

It is certified that error appears in the above-identified patent and that said Letters Patent is hereby corrected as shown below:

In the Claims

Column 15, Line 51, Claim 1:
After "a first portion configured to"
Delete "he" and
Insert -- be --.

Column 17, Line 34, Claim 20:
After "The vehicle of claim"
Delete "13" and
Insert -- 14 --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*